United States Patent
Lindskog et al.

(10) Patent No.: US 7,103,124 B1
(45) Date of Patent: Sep. 5, 2006

(54) SYNCHRONIZATION OF NODES

(75) Inventors: Kristian Mats Lindskog, Sollentuna (SE); Jacob Kristian Österling, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/475,190

(22) Filed: Dec. 30, 1999

(51) Int. Cl.
*H04L 7/00* (2006.01)

(52) U.S. Cl. .................................................. 375/354

(58) Field of Classification Search ................ 375/354, 375/356, 358
See application file for complete search history.

(56) References Cited

U.S. PATENT DOCUMENTS

| | | | |
|---|---|---|---|
| 4,569,042 A * | 2/1986 | Larson | 370/250 |
| 5,408,506 A | 4/1995 | Mincher et al. | |
| 5,697,082 A * | 12/1997 | Greer et al. | 455/255 |
| 5,867,411 A | 2/1999 | Kumar | |
| 5,870,001 A | 2/1999 | Österling et al. | |
| 6,433,739 B1 * | 8/2002 | Soliman | 342/387 |
| 6,661,810 B1 * | 12/2003 | Skelly et al. | 370/516 |
| 2001/0039585 A1 * | 11/2001 | Primak et al. | 709/228 |

FOREIGN PATENT DOCUMENTS

| | | |
|---|---|---|
| EP | 697744 | 2/1996 |
| EP | 722233 | 7/1996 |
| WO | 9813969 | 4/1998 |

OTHER PUBLICATIONS

Falconer, D.D., et al., "Application of Fast Kalman Estimation to Adaptive Equalization", IEEE Transactions on Communications, vol. Com-26, No. 10, Oct. 1978, 1439-1446.

Lindblom, L., "Simplified Kalman Estimation of Fading Mobile Radio Channels: High Performance at LMS Computational Load", IEEE International Conference on Acoustics, Speech, and Signal Processing, Apr. 27-30, 1993, Minneapolis, Minnesota, III-352-III 355.

Haykin, S., "Modern Filters", Macmillan Publishing Company, New York, 349-359.

Brown, Huang, "Introduction to Random Signals and Applied Kalman Filtering", John Wiley & Sons Inc., 1993, 424-428.

Fasbender A. et al: "On Assessing Unidirectional Latencies in Packet-Switched Networks", IEEE International Conference on Communications (ICC), U.S. , New York, NY: IEEE; Jun. 8, 1997; pp. 490-494.

* cited by examiner

*Primary Examiner*—Kevin Burd

(57) ABSTRACT

A method and apparatus for adjusting an oscillator in a network for correcting frequency drift is disclosed. Nodes in the network exchange time stamp messages with each other. The time stamp messages contain the time the stamp message is transmitted, node measurement value of an interval and an uncertainty value for the nodes estimation of the interval. By exchanging measurements of common intervals, nodes can determine how far their oscillators have drifted from the correct oscillating frequency.

50 Claims, 16 Drawing Sheets

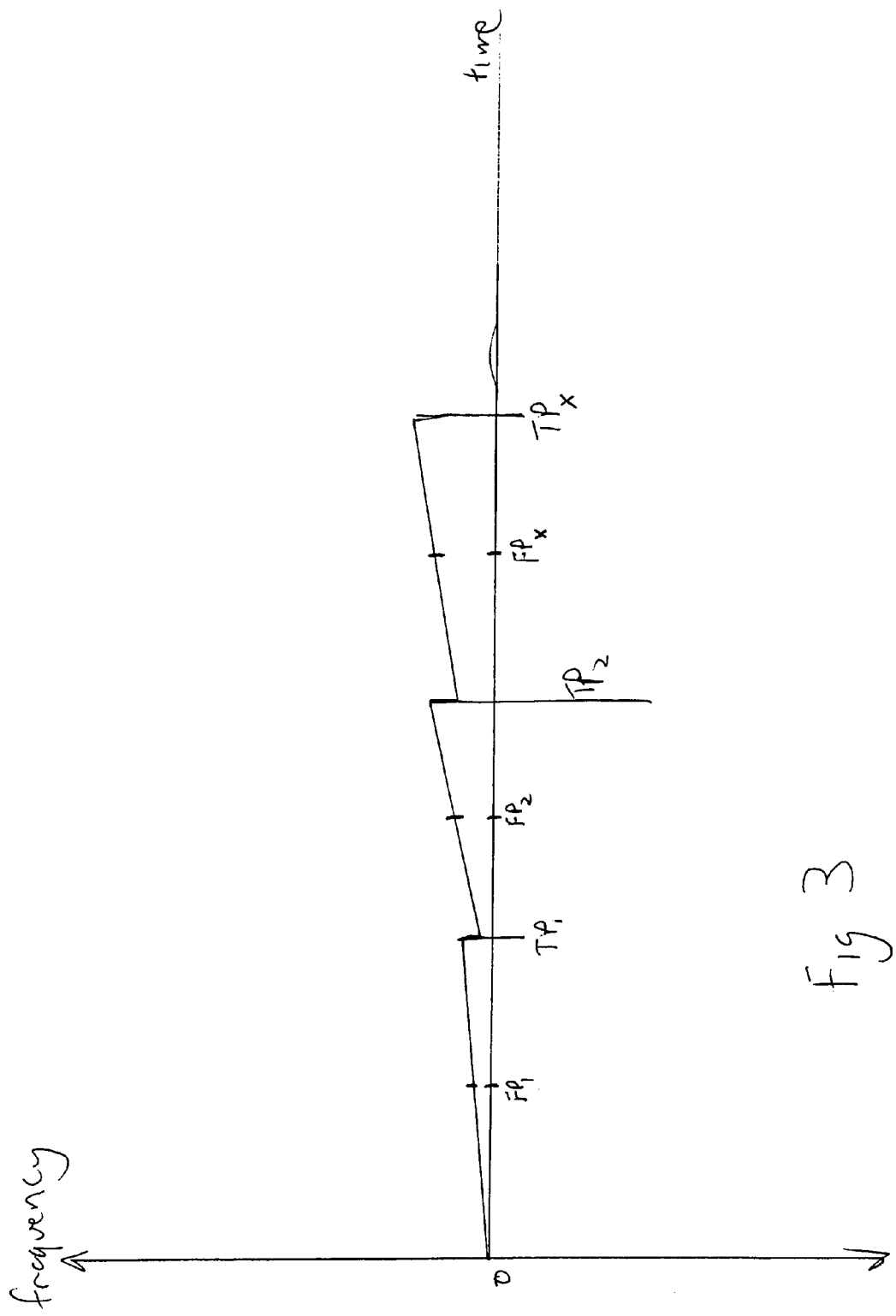

| 510 | 520 | 530 | 540 |
|---|---|---|---|
| Time of Transmission | Last Message Estimated Transmission Delay | Time Interval $x_1$ | Uncertainty Factor (Variance $P_{11}$) |

Fig 5

| 610 | 620 | 630 | 640 |
|---|---|---|---|
| Time of Transmission | Time Between The Reception of Time Stamp and This Transmission ($O_i$) | Time Elapsed Since the Nth Latest Reply Time Stamp Message Was Transmitted | Uncertainty Factor |

Fig 6

| 710 | 720 |
|---|---|
| Absolute Time When the Last Time Stamp Message Was Transmitted | Uncertainty of the Estimate of Absolute Time |

Fig 7

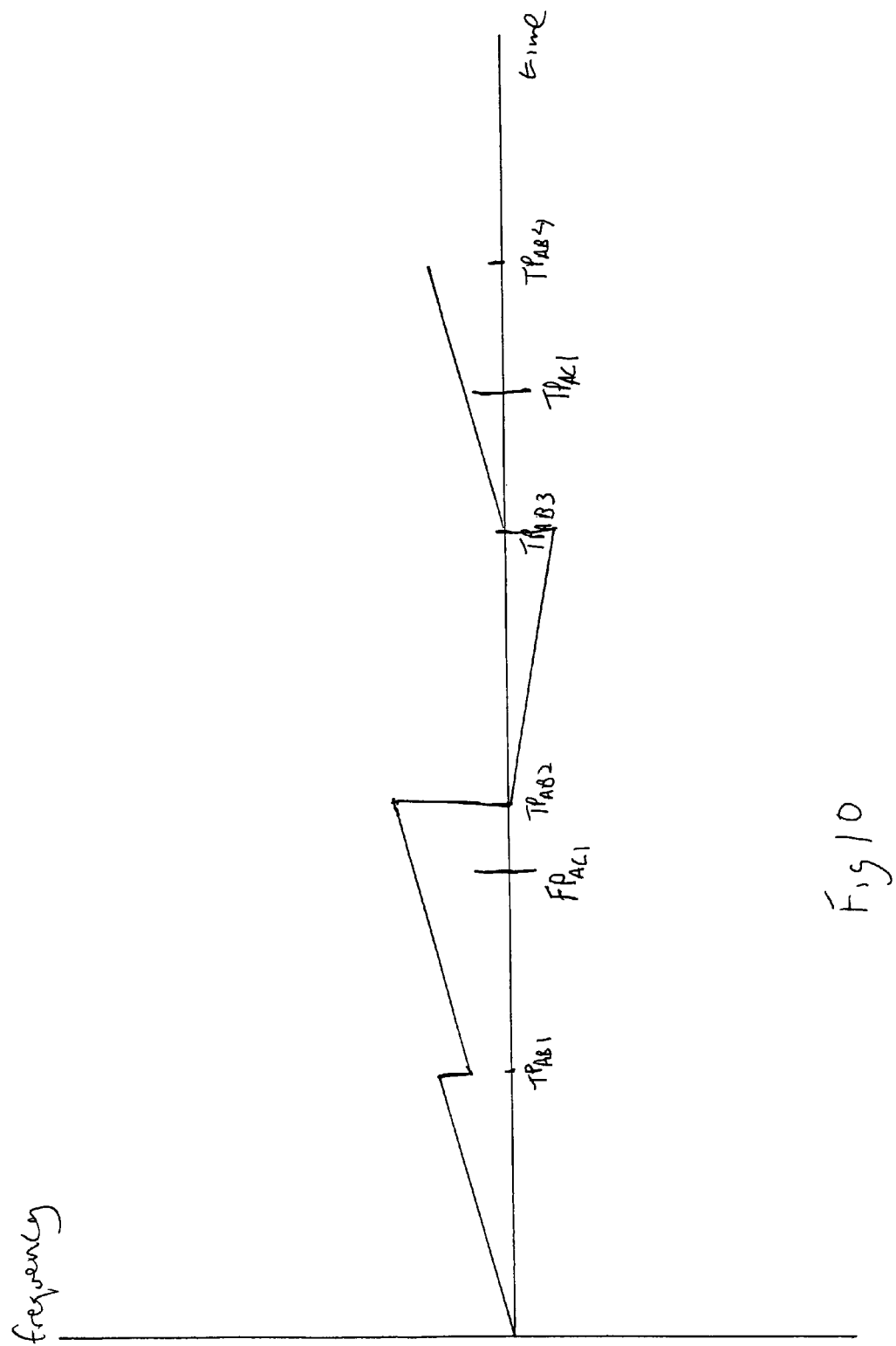

SYNCHRONIZATION OF NODES

BACKGROUND

The present invention relates to the distribution of a time and frequency reference to radio base stations. More specifically, the present invention relates to an efficient way to distribute a frequency and time reference between nodes in a packet-switched network.

In wireless communication systems, such as cellular telecommunications systems, radio base stations are typically interconnected by a packet-switched network. Radio base stations typically use a phase-lock loop, including a voltage controlled oscillator, to maintain frequency stability of the signals generated by the radio base stations. In conventional wireless systems, frequency stability of an oscillator in a radio base station is maintained using a frequency reference which is distributed to radio base stations over the packet-switched network using the pulse code modulated (PCM) reference, i.e. the frame synchronization signal in the E1/T1 transmission protocol. For a more detailed explanation of PCM reference signals, the reader should refer to U.S. Pat. No. 5,870,001 to Österling et al., which is herein expressly incorporated by reference. The use of a frequency reference ensures that the downlink signal generated by the voltage controlled oscillator is properly transmitted to a mobile terminal without interfering with other concurrently transmitted downlink signals, i.e., that the radio base station is transmitting to the mobile station over the correct frequency.

As the sophistication of networking technology increases and the cost of implementation of these networking technologies decreases, radio base stations may soon be interconnected together using newer types of networks. These newer types of networks may not necessarily contain the PCM reference which is present in the E1/T1 transmission protocol. Since these networks may not contain the PCM reference, a new method for correcting the frequency drift of base station oscillators is needed.

Conventional networking technologies use time stamp algorithms to distribute time. In TCP/IP based networks, the network time protocol is used to exchange time stamp messages between network nodes. However, the network time protocol only provides for the distribution of time and not the distribution of frequency as would be required for a radio base station. Further, the network time protocol considers all time stamp messages as equally accurate. Hence, the network time protocol does not take into consideration whether a transmitting node has a very accurate oscillator, e.g., a GPS receiver, or if the transmitting node has an inaccurate oscillator, e.g., a short-term stable free-running oscillator which has not been tuned for a long time.

In addition, the network time protocol does not allow a node to receive frequency information from one node and time information from another. Further, network time protocol is designed for time stamping on an application layer which results in large uncertainties as to the accuracy of the time stamp.

Since, radio base stations may soon be connected to each other through many other types of networks, e.g. ethernet networks, a new method for correcting the frequency drift of oscillators in radio base stations is required. Accordingly, it would be desirable to provide a reference frequency for radio base stations in networks which do not have a PCM reference signal. Further, it would be desirable to provide a method and apparatus for a node in a network to determine the accuracy of its oscillator.

SUMMARY

These and other problems associated with cellular communications are solved by the present invention, wherein a network node adjusts the frequency drift of its oscillator based on time stamp message exchanges with other nodes.

It is an object of the present invention to perform time stamping for the distribution of time and frequency in a packet-switched ethernet network on the physical layer. A common time is used for time transfer and a common interval is used for frequency distribution.

It is another object of the present invention to include information about time stamp uncertainties in the time stamp messages. The time stamp uncertainty information takes into consideration such factors as whether the transmitting node is connected to a GPS receiver or whether the transmitting node uses a short-term, stable, free-running oscillator which has not been tuned for a long time. The receiving node takes into consideration the uncertainty of the information in determining the accuracy of the other nodes time stamp information. These uncertainty values include uncertainties regarding both the time transferred and the measurement of the common interval for frequency distribution. These uncertainties are compared to the uncertainty caused by the uneven delays of the network. In networks which require very accurate frequency references, like a GSM infrastructure, the network delays can be more evenly distributed than in an open network for which network time protocol was designed. Also, within a well-defined network segment, e.g. within a HUB, the delay can be considered small and constant.

It is another object of the present invention to provide methods and apparatus for optimally combining frequency information received from one node and time information received from another node. This is particularly useful when a node is first placed into a network. The node which has been placed in the network can use frequency information from a node which has only an adequate frequency reference (e.g. a stratum 2 oscillator). The time information can be received from a distant time server, which would have been too far away (network delay-wise) to provide a frequency reference for the oscillator of the node which has been started-up.

It is yet another object of the present invention to provide improved fault analysis. Further, the present invention provides optimal usage of network resources. Each node optimally combines information it receives from other nodes relating to time and frequency along with the nodes own estimation of time and frequency. Each node can, based on uncertainty values provided with the time and frequency information from other nodes, determine which information is high-quality information, and each node can discard poor-quality information. The filtered information is forwarded to all other nodes. In this way, any improvement of time or frequency at any node will be distributed to all other nodes.

It is yet another object of the present invention to allow nodes to be peers and have multiple communication partners. This provides redundancy, so that if one node or one communication link fails, time and frequency information can be received from another node. Further, independent communication links will result in different, and uncorrelated, transmission delay variations. The different transmission delay variations provide a diversity gain effect by using the information provided by the various communication partners.

In accordance with one aspect of the present invention, the foregoing and other objects are achieved by a method and/or an apparatus for regulating a frequency deviation of an oscillator in the first node, in a network including a first node and a second node. A time stamp message is received at the second node from the first node. A reply time stamp message is transmitted from the second node to the first node, wherein the reply time stamp message includes a time of transmission of the reply time stamp message and the second node's estimation of a time interval. An estimated frequency deviation of the oscillator in the first node is calculated using the second node's estimation of the time interval in the reply time stamp message.

In accordance with another aspect of the present invention, the foregoing and other objects are achieved by a method and/or an apparatus by a network including a node. The node includes an oscillator and means for receiving time stamp messages. The node also includes a Kalman observer for determining a frequency deviation of the oscillator using information in a received time stamp message.

In accordance with yet another aspect of the present invention, the forgoing and other objects are achieved by a method and/or apparatus for regulating an oscillator in a network node. A time stamp message is transmitted from a first node to a second node, wherein the time stamp message includes the first node's estimate of a time interval. In the second node, the time interval is estimated. A frequency of an oscillator in the second node is adjusted using the first node's estimate of the time interval and the second node's estimate of the time interval.

In accordance with yet another aspect of the present invention, the forgoing and other objects are achieved by a method and/or apparatus for oscillator regulation. A network includes a first node, a second node and a third node. In the first node the length of time of a first time interval and the length of time of a second time interval is estimated. In the first node a time stamp message is received from the second node, wherein the time stamp message includes the second node's estimation of the first time interval. A time stamp message is received by the first node from the third node, wherein the time stamp message includes the third node's estimation of the second time interval. A frequency deviation of the oscillator of the first node is determined based on the first node's estimation of the first and second time intervals, the second node's estimation of the first time interval and the third node's estimation of the second time interval.

BRIEF DESCRIPTION OF THE DRAWINGS

The present invention will now be described with reference to the accompanying drawings in which:

FIG. 3 illustrates the frequency drift of an oscillator over time;

FIG. 5 illustrates an exemplary time stamp message according to the present invention;

FIG. 6 illustrates an exemplary reply time stamp message according to the present invention;

FIG. 7 illustrates an exemplary absolute time message according to the present invention;

FIG. 10 illustrates the frequency drift of an oscillator over time;

DETAILED DESCRIPTION

In the following description, for purposes of explanation and not limitation, specific details are set forth, such as particular circuits, circuit components, message formats, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
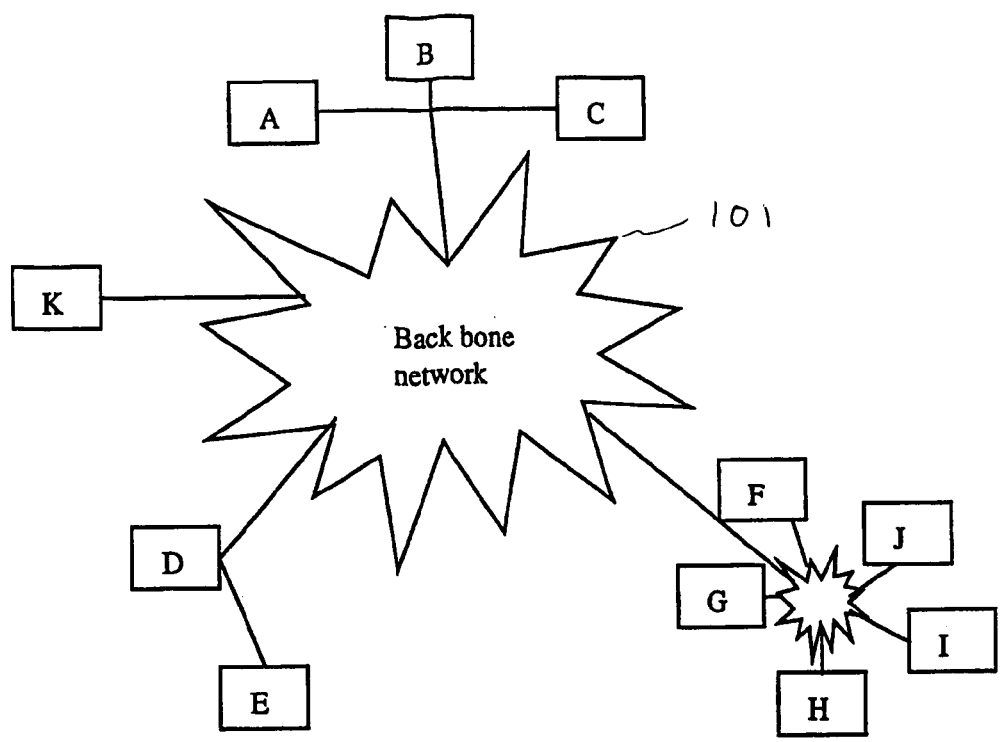
FIG. 1 illustrates an exemplary network and the interconnection of a plurality of radio base stations.

FIG. 1 illustrates an exemplary network which may be used to implement the present invention. The network comprises a backbone network 101 and nodes A–K. Nodes A–K communicate with each other over a backbone network 101. The communication links can either be on a physical layer, i.e., where the network is actually physically connecting the nodes, or on an application layer, i.e., where the nodes communicate via routers, switches and other devices.

According to an exemplary embodiment of the present invention, nodes A–J receive a list of nodes with which each node is to exchange time stamp messages from a central server node K. The perceived quality of the time stamp message interchange between nodes A–J can be reported continuously to the central node server K, which then can optimize the lists based upon factors such as proximity of the nodes and the accuracy of oscillators used by the nodes.

The backbone network 101 can be implemented using any type of networking technology such as a synchronous or an asynchronous network, a packet-switched network or a circuit switched network. Of course, one skilled in the art will recognize that different methods of time stamping may apply for different implementations of the network layers.

According to exemplary embodiments of the present invention, time stamp messages are interchanged between the nodes of the network to transfer information about absolute time and frequency. The time stamp message will contain a node's estimation of a time interval. The node which receives the time stamp message will compare its own estimate of the time interval with the estimate of the time interval in the received time stamp message. If it is assumed that the estimate of the time interval in the time stamp message is more accurate than the node's estimate of the time interval, any difference between the two estimations represents the frequency deviation of the oscillator. As will be described in more detail below, each node will determine a value associated with the node's uncertainty of its estimate of the time interval. The uncertainty value can be used to determine which estimate of the time interval is more accurate. As will be described in more detail below, these time stamp messages are used in various calculations by the nodes. The frequency of the oscillators in the various nodes is controlled based upon the results of these calculations.

Figure 2:
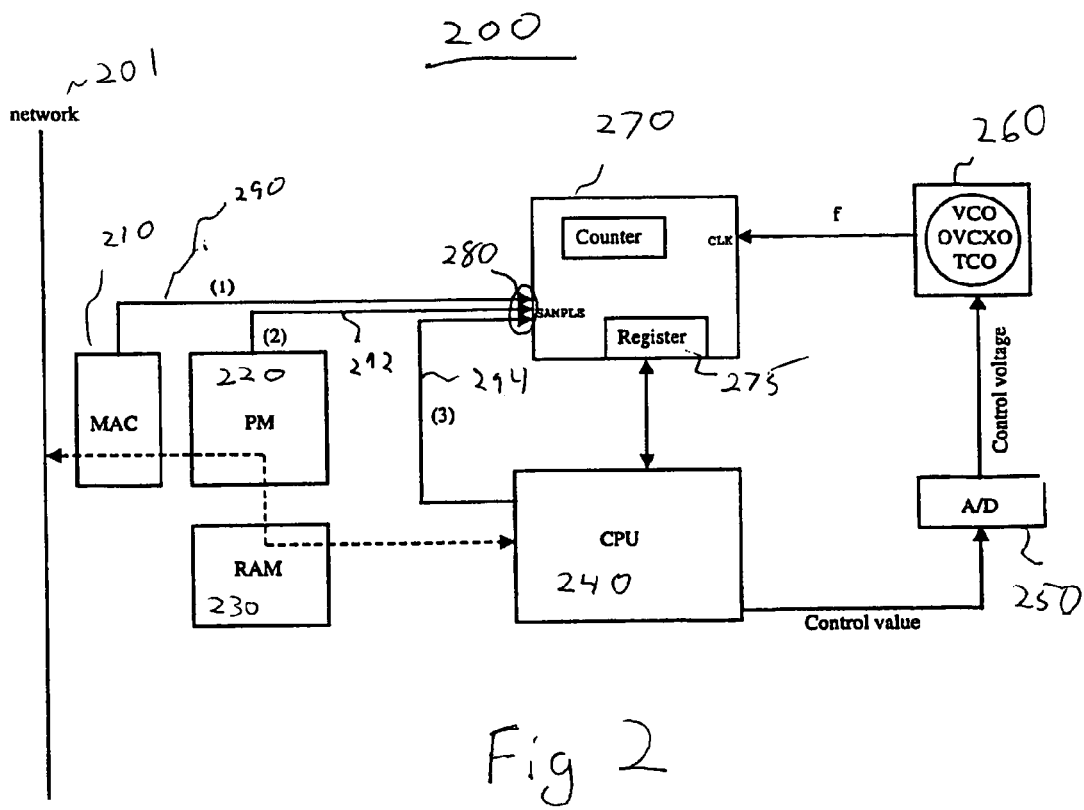
FIG. 2 illustrates an exemplary implementation of a radio base station node which operates in the exemplary network.

FIG. 2 illustrates an exemplary node 200 for implementing the present invention. The node 200 includes a media access controller (MAC) 210, a protocol manager (PM) 220, a random access memory (RAM) 230, a central processing unit (CPU) 240, an analog-to-digital (A/D) converter 250, a voltage controlled oscillator (VCO) 260, and a free running counter 270. Although MAC 210, protocol manager 220, RAM 230, CPU 240, A/D converter 250, VCO 260 and counter 270 are illustrated as discrete components, one skilled in the art will recognize that functions of these components can be combined either in hardware or in software.

Messages are received by the node 200 from the network 201. The received messages are decoded by the MAC 210, which is part of the physical layer. The messages decoded by MAC 210 are passed to protocol manager 220. The protocol manager 220, which is part of the protocol layer, interprets the decoded messages. The protocol manager 220 passes the interpreted messages to RAM 230 for storage. Once the messages have been stored in RAM 230, the CPU 240 can access the messages for processing.

With respect to a packet-switched network, one skilled in the art will recognize that the exact functions of the MAC and the protocol manager depend on the type of network being implemented. For example, in an ethernet based TCP/IP network, the MAC handles the ethernet layer, the protocol manager handles the IP layer and the CPU handles the TCP layer. Alternatively, in a circuit-switched network, the MAC can decode frame boundaries, and the protocol manager can extract and/or rearrange bits.

VCO 260 clocks a free-running counter 270. The free-running counter 270 holds the relative time of the node 200. The relative time of the node can be sampled by a signal connected to the SAMPLE-input 280. When SAMPLE-input 280 is activated, the current counter value will be copied to a register 275. Register 275 is accessible by the CPU (and if necessary, to the Protocol Manager). The frequency of the VCO is controlled by software in the CPU 240 via the A/D converter 250.

In general, time stamp messages are received in node 200. Based on the time stamp messages, CPU 240 controls VCO 260 in order to maintain an accurate frequency reference for node 200. Since accurate updating of the oscillator depends on accuracy of the time stamp messages, the time stamping shall preferably be performed on the physical layer. For example, in an ethernet based network the time stamping shall be done by the ethernet media access controller 210 for both transmission and reception time stamps.

Although exemplary embodiments of the present invention have been described as beginning the transmission of the time stamp message on the physical layer, one skilled in the art will recognize that other methods for beginning the transmission can be implemented. For example, according to one alternative method, the protocol manager 220 sends a signal over path 292 to counter 270 indicating that the current value in the counter 270 should be sampled. The signal is sent from protocol manager 220 to the counter 270 when the MAC 210 is instructed to transmit the first bit of the message. According to a second alternative method, the CPU 240 sends a signal over path 294 indicating that the current counter value should be sampled. The signal is sent from the CPU 240 to the counter 270 when the protocol manager 220 is instructed to transmit a message which is stored in RAM 230. In all three methods, the CPU 240 reads and stores the sampled counter value and uses the sampled counter value as the time corresponding to the time stamp message transmission.

Although exemplary embodiments of the present invention describe time stamping occurring at the beginning of transmission of a time stamp message, one skilled in the art will recognize that other predetermined common time events can be used for time stamping, e.g., the end of transmission of a time stamp message.

In the first and second methods the CPU 240 forms the contents of the time stamp message and stores it in RAM 230. When the time stamp message is transmitted, the CPU 240 might be occupied with other tasks and cannot be interrupted. Accordingly, the CPU 240 may not be able to copy the contents of the register 275 into the message before that part of the message is actually transmitted. The problem which arises from this can be addressed in different ways. First, the protocol manager 220 may read the contents of the register 275 and insert the contents in the proper place in the time stamp message. Any necessary formula for converting the register value to absolute time is included in the time stamp message or executed by the protocol manager 220. Alternatively, the time stamp message may be divided into two separate sub-messages. The first sub-message is a short message which contains only a sequence number and the time of transmission is used for triggering time stamping, while second sub-message, which is formed shortly after the first sub-message, contains the information about when the first sub-message was transmitted. Accordingly, the CPU 240 will then have the necessary time to read the register 275, calculate the absolute time of transmission, and formulate the second message.

When a time stamp message is received by a node, the node will perform a reception time stamp to calculate the network delay. The time stamping of a message upon reception is performed by sampling the counter value at the time of reception. There are three alternate methods for accomplishing the time stamping of a message upon reception. According to the first method, the MAC 210 sends a sample signal over path 290 to the counter 270. The sample signal is sent when the MAC 210 samples the first bit of a received message. The protocol manager 220 then "confirms" that it has interpreted the message to be a time stamp message addressed to this particular node. Alternatively, the confirmation is performed by the MAC 210 if the message uses a MAC address which is associated with the node 200. Alternatively, in IP/ethernet based networks the MAC 210 confirms the message only if the MAC 210 also determines that the message is dedicated for time stamp messages.

The second method for accomplishing time stamping of a message upon reception involves the protocol manager 220. The protocol manager 220 sends a sample signal to the counter when enough of the message has been interpreted so that the protocol manager 220 can determine that the time stamp message was addressed to this particular node.

According to the third method for accomplishing time stamping of a message upon reception, the CPU 240 sends a sample signal over path 294 to the counter 270. The sample signal is sent from the CPU 240 to the counter 270 when enough of the message is interpreted by the CPU 240 to determine that the message is a time stamp message addressed to this particular node. For all three methods of reception time stamping described above, the CPU 240 reads and stores the sampled counter value and uses it as time of message reception.

Now that an exemplary network for implementing the present invention has been described, a general overview of the operation of the present invention will be described in connection with FIGS. 3 and 4.

FIG. 3 is a graph illustrating the frequency drift of an exemplary oscillator in a network node over time. The horizontal axis represents time and the vertical axis represents the deviation of the oscillator frequency of a node from the correct frequency. The graph illustrates how the oscillator frequency is drifting over time while a graph coincident with the horizontal axis would represent the correct frequency of the oscillator. Assume that at time 0 the oscillator has the correct frequency, as illustrated. As time passes, moving to the right on the horizontal axis, the oscillator frequency begins to drift from the correct frequency. During the time period between 0 and time point $TP_1$ the node exchanges time stamp messages with another node. The time point is a point in relative time when the last time stamp message in a time stamp message exchange period was transmitted. The absolute time calculated as a result of the exchange of time stamp messages is valid at this point. At time point $TP_1$ the node estimates the frequency drift during the time period between time 0 and time $TP_1$. As will be described in more detail below, when comparing intervals, the average frequency deviation and its derivative over the interval are calculated. Assuming linear drift of the oscillator, the average frequency deviation is in the middle of the interval. Accordingly, the estimated frequency drift is valid at the frequency point $FP_1$. The node stores the value of the node's counter at $TP_1$ and $FP_1$. At $TP_1$ the node uses a control voltage to adjust the frequency of the oscillator based upon the estimated frequency drift of the node's oscillator. This is illustrated in FIG. 3 by the movement of the frequency drift toward the horizontal axis at time point $TP_1$.

During the time period between $TP_1$ and $TP_2$ the nodes continue to exchange time stamp messages. Also during the time period between $TP_1$ and $TP_2$, the frequency of the oscillator begins to drift. Again, based upon the exchanged time stamp messages, the node adjusts the frequency of its oscillator at time point $TP_2$. The nodes continue to exchange messages and adjust the frequency of their oscillators as illustrated by time point $TP_x$. Although FIG. 3 illustrates three frequency points, $FP_1$, $FP_2$, $FP_x$, as will be described in more detail below, once a new frequency point is established by the node, the prior frequency points are no longer valid.

As discussed above, based on the messages exchanged between the nodes, each node can make certain predictions of the state of the system in the node. According to exemplary embodiments of the present invention a non-stationary Kalman observer is used to predict the values of the system state variables at different points in time. The Kalman observer can also be used to measure the time intervals between the exchange of time stamp messages. The Kalman observer is a time-discrete iterative algorithm for determining the state variable of a state space model of the system. One skilled in the art will recognize that the Kalman observer can be implemented either in a CPU or in a dedicated digital signal processor.

As will be described in more detail below, the Kalman observer will not iterate at fixed time intervals. Instead, the time intervals depend on when time stamp messages have been interchanged. Therefore, the boundaries of the time intervals are established when the node's oscillator frequency is updated, i.e., the time points illustrated in FIG. 3. Also, at the latest of these time points, the best estimate of absolute time will be known.

The model of the current state in each node can be represented by the equation below:

$$X = \begin{pmatrix} x_1 \\ x_2 \\ x_3 \end{pmatrix} = \begin{pmatrix} \text{Time} \\ \text{Frequency error} \\ \text{Frequency drift per time unit} \end{pmatrix} \quad (1)$$

wherein $x_1$ is used to measure time intervals and to predict absolute time, $x_2$ and $x_3$ are used to a model of the frequency drift of the oscillator over a period of time.

A discrete time model of the system can be represented by the equation below:

$$X_k = F_k X_{k-1} G_k + V \quad (2)$$

where $F_k$ and $G_k$ are matrices which model the system and can be represented by the equations below:

$$F_k = \begin{pmatrix} 1 & T_k & T_k^2/2 \\ 0 & 1 & T_k \\ 0 & 0 & 1 \end{pmatrix} \quad (3)$$

$$G_k = \begin{pmatrix} T_k \\ 0 \\ 0 \end{pmatrix}$$

and where $T_k$ represents the number of oscillator cycles between two updates of the oscillator. Of course, one skilled in the art will recognize that the matrices for $F_k$ and $G_k$ will vary depending upon the type of system being modeled. One skilled in the art will also recognize that if the Kalman observer is used to iterate backwards in time, $T_k$ will have a negative value.

$V_k$ represents the noise of the state model caused by the frequency drift of the oscillator and can be represented by the equation below:

$$V_k \in N(0, Q_k) \quad (4)$$

where $Q_k$ can be represented by the equation below:

$$Q_k = \begin{pmatrix} |T_k| & T_k^2/2 & |T_k^3/6| \\ 0 & |T_k| & T_k^2/2 \\ 0 & 0 & |T_k| \end{pmatrix} \begin{pmatrix} 0 & 0 & 0 \\ 0 & \Psi_1 & 0 \\ 0 & 0 & \Psi_2 \end{pmatrix} \quad (5)$$

The values $\Psi_1$ and $\Psi_2$ represent the frequency deviation over time of the oscillator which is used as local reference in the node. These values are node specific because different nodes may use different types of oscillators. The value may be stored in a nonvolatile memory.

To model different oscillators, the following values can be used:

For a stratum 2 oscillator:

$$\begin{cases} \Psi_1 = 4 \cdot 10^{-20} \\ \Psi_2 = 3.2 \cdot 10^{-27} \end{cases} \quad (6)$$

For a stratum 3 oscillator:

$$\begin{cases} \Psi_1 = 1.6 \cdot 10^{-19} \\ \Psi_2 = 3.2 \cdot 10^{-21} \end{cases} \quad (7)$$

Of course, one skilled in the art will recognize that stratum 2 and stratum 3 oscillators are merely exemplary types of oscillators and that if another type of oscillator is used that other values for $\Psi_1$ and $\Psi_2$ can be used.

A measurement made by the Kalman observer during the kth iteration can be represented by the following equation:

$$y_{p,k} = H_p X_k + n_k \quad (8)$$

wherein $H_p$ is a matrix which depends upon whether the measurement $y_k$ is representing absolute time or frequency deviation, $X_k$ is the discrete model of the system and $n_k$ is the measurement noise of the measurement $y_k$ for the kth iteration of the Kalman observer, and may be represented by the equation:

$$n_k \in N(O, R_k) \quad (9)$$

wherein $N(O, R_k)$ is the normal distribution with the covariance $R_k$. One skilled in the art will recognize that the measurement noise is the uncertainty of the accuracy of a measurement by the Kalman observer. This uncertainty can be represented by a variance value. For ease of explanation, the measurement noise will be herein referred to as the measurement uncertainty or measurement variance.

If the measurement made by the Kalman observer $y_{p,k}$ during the kth iteration of the Kalman observer represents the absolute time when the time stamp messages are exchanged, then $H_p$ can be set equal to the vector below:

$$H_1 = (1\ 0\ 0)$$

If the measurement made by the Kalman observer $y_{p,k}$ at time k represents the frequency deviation of the oscillator, then $H_p$ can be set equal to the vector below:

$$H_2 = (0\ 1\ 0) \text{ for frequency deviation}$$

A complete deduction of the Kalman observer can be found in the fundamental control theory literature, for example, Brown, Huang, *Introduction To Random Signals and Applied Kalman Filtering*, John Wiley & Sons Inc., 1993, which is herein expressly incorporated by reference.

The non-stationary Kalman observer exhibits a state vector $\hat{x}_k$ which is the estimated state vector of the observed system, based on the measurements 1 to k−1, which minimizes $E[(X_k - \hat{x}_k)^2]$, where $X_k$ is the true state vector.

$$\epsilon_k = y_k - H\hat{x}_k \quad (10)$$

The kth iteration of the Kalman observer can be represented by the equation below:

wherein $\epsilon_k$ is the innovation which is the difference between the measured output $y_k$ and the predicted output $H\hat{x}_k$.

Then the covariance of the innovation $S_k$, is the sum of the measurement covariance and the prediction covariance and can be represented by the following equation:

$$S_k = HP_k H^T + R_k \quad (11)$$

$$K_k = F_k P_k H^T S_k^{-1} \quad (12)$$

The Kalman gain, $K_k$, is then calculated using the following equation:

The Kalman observer is advanced one time step and a correction based upon the calculated innovation and the Kalman gain is made as follows:

$$\hat{x}_{k+1} = F_k \hat{x}_k + G_k + K_k \epsilon_k \quad (13)$$

$$P_{k+1} = F_k (P_k - P_k H^T S_k^{-1} H P_k) F_k^T + Q_k \quad (14)$$

Then the covariance, P, for $\hat{x}_{k+1}$ is calculated as follows:

where $\sqrt{P_{11,k+1}}$ is the standard deviation of the estimated absolute time.

For each new iteration of the Kalman observer k, the Kalman observer determines the discrete time interval of the prediction $T_k$, measurement $y_k$ and a measurement uncertainty variance $R_k$. In the general case, all other matrices and values can also depend upon the iteration k, but here, such values are constant. If no measurement is available, $R_k$ is set to infinity, which makes $S_k$ equal to infinity. Thereby, the covariance of the innovation is also set to infinity, and $K_k = 0$, $\hat{x}_{k+1} = Fk\hat{x}_k + G_k$ and $P_{k+1} = F_k P_k F_k^T + Q_k$.

As a priori knowledge, additional information is not required except for the values of the model matrices F and H, the covariance matrix of the system uncertainty Q, the initial state vector $\hat{x}_0$, and its covariance matrix $P_0$.

The uncertainty of the frequency of the oscillator, $P_{22}$ and $P_{33}$, can also be adjusted if changes in the environment are detected, e.g. if the temperature falls, or if the current consumption of the oscillator increases. Based on the state model and the time stamp message exchanged between the node, the Kalman observer can be used to predict future values of the system.

Figure 4A:
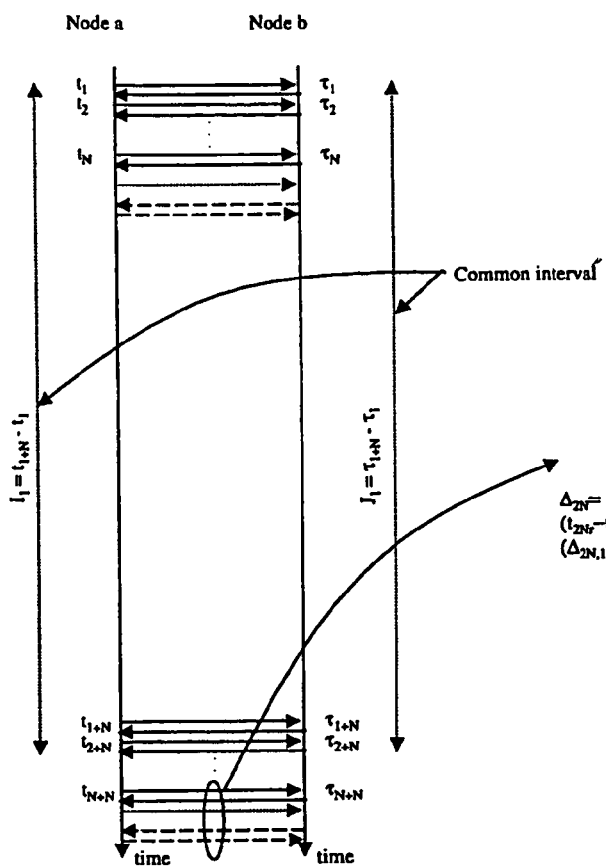
FIGS. 4A and 4B illustrate a time stamp message exchange between two nodes according to an exemplary embodiment of the present invention.
Figure 4B:
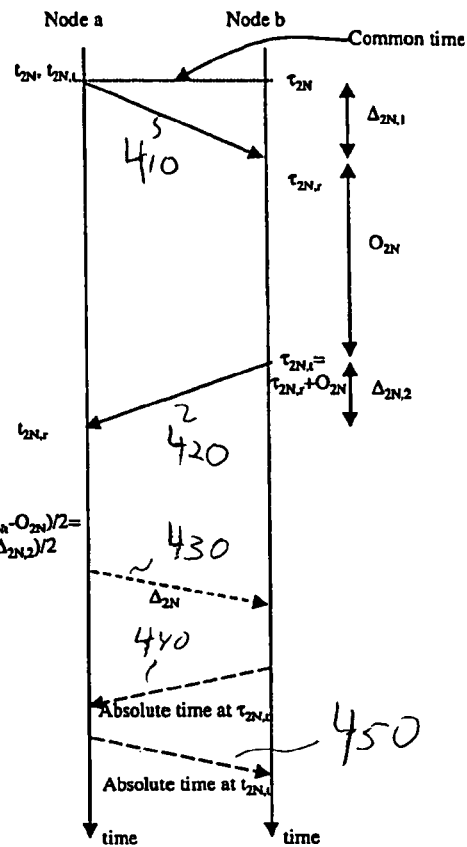

The signaling between two nodes in a network is illustrated in FIGS. 4A and 4B. FIG. 4A illustrates a plurality of time stamp message exchange periods between two exemplary nodes, node A and node B over a message exchange interval. Nodes A and B can be constructed in a similar manner to that described above with respect to FIG. 2. FIG. 4A illustrates two time stamp message exchange periods. In FIG. 4A, $I_1$ represents the time interval between the time the first time stamp message is transmitted from node A to node B during the first time stamp message exchange time period and the time the first time stamp message is transmitted from node A to node B during the second time stamp message exchange period. Similarly, $J_1$ represents the time interval at node B which can be related to $I_1$. In the equations below, $J_1$ is defined as the time interval between the time the first reply time stamp message is transmitted from node B to node A during the first time stamp message exchange period and the time the first reply time stamp message is transmitted from node B to node A during the second time stamp message exchange period.

FIG. 4B is an exploded view of the second time stamp message exchange time period illustrated in FIG. 4A. When node A transmits a time stamp message 410 at time $t_{1,t}$, it is received by node B at time $\tau_{1,r}$. The difference in time between the transmission of the first time stamp message by node A and the reception of the time stamp message by node B is the transmission delay caused by the network over which the message is transmitted. This transmission delay can be represented by $\Delta_{1,1}$.

FIG. 5 illustrates various fields in an exemplary time stamp message. The time stamp message includes a time of transmission field 510, which contains the value associated with the counter at the time that the time stamp message is transmitted. Field 520 contains a value representing the node estimation of the network delay during the last time stamp message exchange. Field 530 contains a value representing the elapsed time since the Nth latest time stamp message was transmitted when this time stamp message is transmitted, a value which is represented as $x_1$. Field 540 contains a value for the uncertainty of the interval value of field 530, which is represented by the variance value $P_{11}$. As described above, according to one embodiment of the present invention a first sub-message contains a sequence number. The second sub-message contains the sequence number of the first sub-message (not illustrated) and fields 510, 520, 530 and 540.

As described above, according to exemplary embodiments of the present invention, frequency deviation of the oscillator is determined by comparing estimations of a time interval. The time interval is bounded by an event which is common to the two nodes exchanging time stamp messages. The common event can be the start of the transmission of the first sub-message. Alternatively, in a synchronous network, e.g., a network which operates according to the G.703 standard, the common event can be the beginning of the frame which directly follows the last frame of the time stamp message.

Referring again to FIG. 4B, since node B may be performing other tasks when the time stamp message is received from node A, node B may not immediately respond to the time stamp message. Instead, node B transmits the reply 420 $O_1$ time units after reception of time stamp message 410. The value $O_1$ is included in the reply time stamp message. FIG. 6 illustrates an exemplary format for the reply time stamp message which is transmitted in response to the time stamp message. The reply time stamp message includes field 610 which contains the time, i.e., the counter value, of when the reply message is transmitted. The reply time stamp message also includes field 620 which contains the time, $O_i$, between the reception of the time stamp message at node B and the transmission of this reply time stamp message to node A. Field 630 contains a value corresponding to the amount of time elapsed since the Nth latest reply time stamp message was transmitted and this reply time stamp message is being transmitted. Field 640 contains a value corresponding to the uncertainty of the interval value of field 630.

Upon reception of the reply time stamp message from node B, node A calculates the average transmission delay $\Delta_1$ caused by the network. The average transmission delay can be calculated using the following formula:

$$\Delta_{2N} = (t_{2Nr} - t_{2Nt} - O_{2N})/2 \quad (15)$$

where $t_{2Nr}$ is the time that the reply time stamp message was received at node A, $t_{2Nt}$ is the time which the time stamp message was transmitted from node A, and $O_{2N}$ is the delay at node B between the reception of the time stamp message from node A and the transmission of the reply time stamp message to node A. The equation above assumes that the transmission delay is the same in both the node A to node B direction as well as the node B to node A direction. However, if the transmission delay is not the same in both directions the time/interval transferred between nodes A and B will have an error of $(\Delta_{2N,1} - \Delta_{2N,2})/2$.

After calculating the mean transmission delay, node A reports this value to node B in message 430. Alternatively, if more time stamp messages are to be sent directly after the calculation of the mean transmission delay $\Delta_1$ by node A, time stamp message 430 can be a time stamp message which includes the mean transmission delay instead of reporting the mean transmission delay in a separate message. The provision of the mean transmission delay in a time stamp message reduces the message load on the network. Any variation in the transmission delay can be estimated by sending N time stamps directly after each other and calculating the variation of $\Delta_i$, $i=N \ldots 2N$. To minimize this uncertainty, well-balanced networks should be used. Also, the time of day the time stamps messages are interchanged can be chosen wisely since it is the traffic load that causes the variations. The problem is less significant within a network segment than between network segments.

When all N time stamp messages are transmitted, each node transmits the estimated absolute time of the last transmitted time stamp message. As illustrated in FIG. 4B, one absolute time message is sent in each direction. FIG. 7 illustrates an exemplary format for the absolute time message. The absolute time message is sent when the frequency deviation of the oscillator has been corrected for drift. The absolute time message contains field 710 which includes a value corresponding to the nodes estimate of the absolute time when the last time stamp message was transmitted. Field 720 contains a value corresponding to the uncertainty of the estimate of the absolute time value in field 710.

For every time stamp message sent, the counter value is stored. The counter value is incremented by the oscillator alone, i.e. it merely counts oscillator clock cycles. The time of an interval is therefore the difference in relative time between the bounds multiplied by the average frequency of the oscillator during that interval.

An alternative to sending N time stamp messages within a short period of time is to send the N time stamp messages evenly distributed over the interval, e.g., interval $I_1$. Assuming that the network load is constant over time, this will not have any impact on performance. If the network load changes over time, a smaller transmission delay spread is achieved if the N time stamp messages are kept together. If the time for the N messages was chosen when there is congestion in the network, and the transmission delay estimates show an uneven delay in the two directions a new attempt is made shortly thereafter.

Now that the basic signaling between the nodes has been explained, an exemplary method for implementing the inventive time stamp message exchange will be described below in connection with FIG. 8. A more detailed description of how the values in each of the steps are calculated will be discussed in more detail below.

Figure 8:
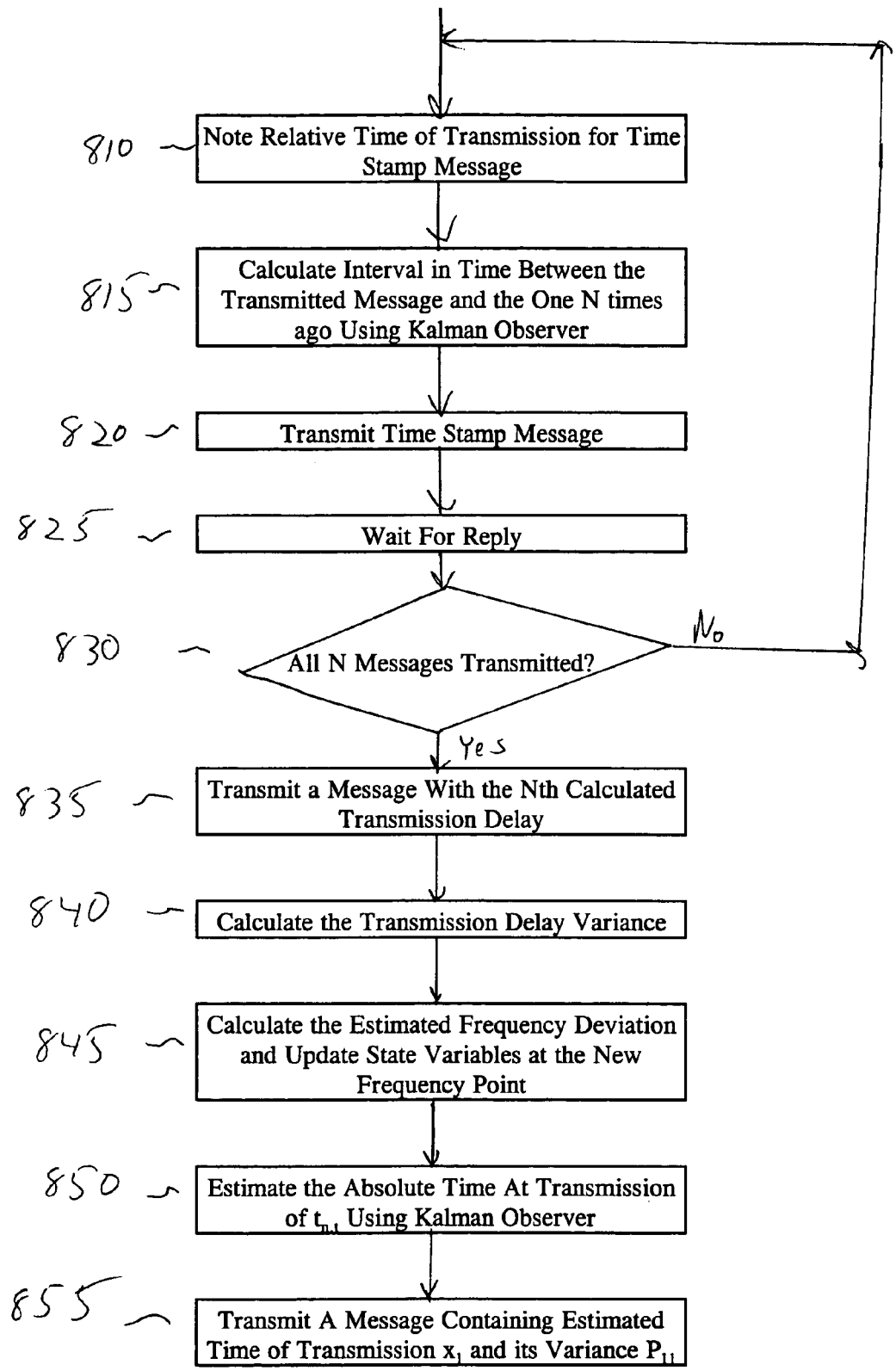
FIG. 8 illustrates an exemplary method for transmitting the time stamp messages.

FIG. 8 illustrates an exemplary method for transmitting the time stamp message from a node which is initiating the time stamp message exchange, e.g., node A in FIGS. 4A and 4B. In step 810 node A notes the relative time of transmission for the first sub-message, e.g., a message containing only a sequence number, of the time stamp message and stores this value. In step 815 the interval in time between when the transmitted time stamp message and the time stamp message which was transmitted N times ago is calculated using the Kalman observer.

In step 820 node A transmits the second sub-message of the time stamp message, which as illustrated in FIG. 5 contains the time the first sub-message was transmitted, the time interval ($x_1$) calculated in step 815, the time interval uncertainty ($P_{11}$), and the last transmission delay. In step 825 node A waits for a reply from node B. In step 830 node A determines whether all N messages for the time stamp message exchange period have been transmitted from node A to node B. If not all N messages have been transmitted, in accordance with the "No" path out of decision step 830, then node A repeats steps 810–825 until it is determined that all N messages have been transmitted. This repetitive transmission of N messages is used to ensure that the nodes have an accurate estimation of the delay caused by the network.

If all N messages have been transmitted, in accordance with the "Yes" path out of decision step 830, node A transmits a message with the Nth calculated transmission delay, in accordance with step 835. In step 840 node A calculates the transmission delay variance. In step 845 node A calculates the estimated frequency deviation, and updates the state variable at the new frequency point. In step 850 node A estimates the absolute time at transmission of the first time stamp message from node A to node B, $t_{n,t}$, using the Kalman observer.

The calculations, and updating of absolute time, is made after the calculations, and updating, of the frequency estimate. This is due to the fact that the new frequency estimate should be used when estimating the absolute time at the transmission of the time stamp messages. In step 855 node A transmits a message containing the estimated time of transmission $x_1$ and its variance $P_{11}$. When the frequency and time have been updated, the node stores the counter value for each time point, the oscillator correction applied at each time point, the estimated absolute time at the latest time point and the variance of the estimated absolute time at the latest time point. For the latest frequency point, the counter value at the frequency point is stored and the state vector of the node at the frequency point is stored.

Figure 9:
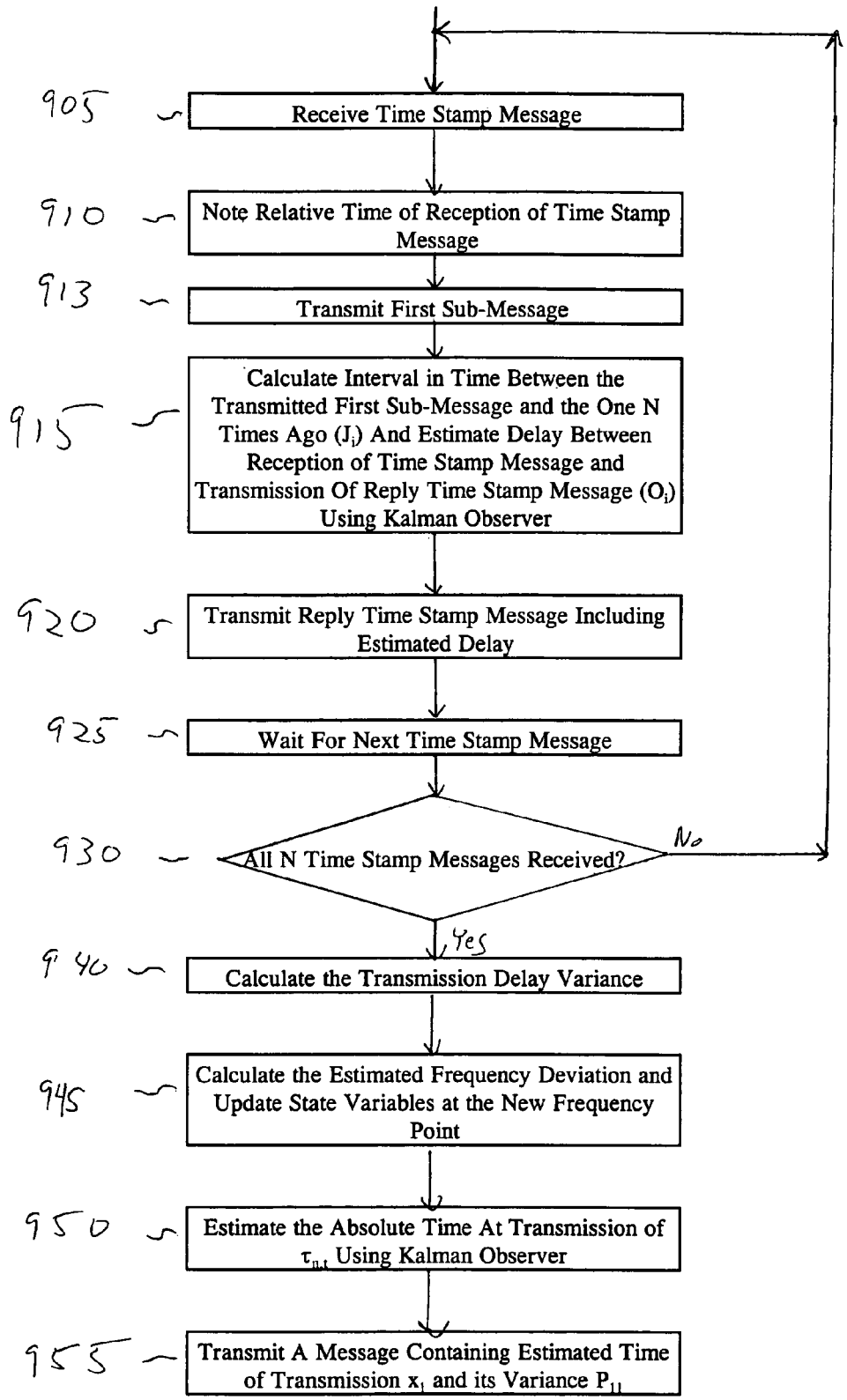
FIG. 9 illustrates an exemplary method for reception of the time stamp messages.

FIG. 9 illustrates an exemplary method for a node receiving time stamp messages. In step 905 the node receives the time stamp message sent from another node. In step 910 the node notes the relative time of the reception of the received time stamp message. In step 913, the node transmits the first sub-message of the reply time stamp message. Similar to the first sub-message of the time stamp message, the first sub-message of the reply time stamp message contains only a sequence number. In step 915 the interval in time between the transmitted first sub-message of the reply time stamp message and the first sub-message of the reply time stamp message received N times ago is calculated. The node also estimates the delay between the reception of the time stamp message and the transmission of the reply time stamp message using the Kalman observer. In step 920 the node transmits the reply time stamp message including the delay estimated in step 915. In step 925 the node waits for the reception of the next time stamp message from the other node.

In step 930 it is determined whether all N time stamp messages have been received from the other node. If all N time stamp messages have not been received from the other node, in accordance with the "No" path out of decision step 930, then the node receives the next time stamp message in accordance with step 905. If all N time stamp message have been received from the other node, in accordance with the "Yes" path out of decision step 930, then the transmission delay variance is calculated in accordance with step 940.

In step 945 the estimated frequency deviation is calculated and the state variables are updated at the new frequency point. In step 950 the absolute time at the transmission of time stamp $\tau_{n,t}$ is estimated using the Kalman observer. In step 955 a message containing the estimated time of transmission $x_1$ and its variance $P_{11}$ is transmitted to the other node.

Now that the overall message transmissions between the nodes has been described, a more detailed explanation will be presented of how the values, which are inserted in the messages, are calculated by the nodes. As described above, in order to synchronize the clocks of the two nodes it is necessary to determine the transmission delay caused by the network. Since a plurality of messages are transmitted between nodes A and B, the transmission delay variance is calculated to ensure that the calculation of the transmission delay between the nodes is not adversely affected by messages which are stuck in the network. This variance is then compared with a confidence interval which ensures that the calculations are not affected by irregular events.

As described above, node A can calculate the network delay for one message exchange period by subtracting the time that the first time stamp message was transmitted from node A and the amount of delay at node B before the reply message is transmitted from the time of reception at node A of the reply message from node B as illustrated by the equation below:

$$\Delta_i = (t_{i,r} - t_{i,t} - O_i)/2 \qquad (16)$$

wherein $\Delta_i$ represents the network delay for the ith time stamp message. The equation above assumes that the network delay is the same in both the node A to node B direction as the network delay in the node B to node A direction, as evidenced by the division of the equation by two. Once the network transmission delay for the ith time stamp message has been calculated using the equation above, the average transmission delay is calculated using the equation below:

$$\mu_{\Delta,n} = \frac{1}{N} \sum_{(n-1)*N+1}^{n*N} \Delta_i \qquad (17)$$

wherein N is the number of time stamp messages sent during a time stamp message exchange period, and n represents the total number of time stamp message exchange periods. The variance of the transmission delay for the nth time stamp exchange period is then calculated using the formula below:

$$s_{\Delta,n}^2 = \frac{1}{N-1} \sum_{(n-1)*N+1}^{n*N} (\Delta_i - \mu_{\Delta,n})^2 \qquad (18)$$

Next, each $\Delta_i$ is checked against a confidence interval with a predefined confidence level to ensure that time stamp messages which get stuck in the network do not adversely influence the calculations of the Kalman observer. If the $\Delta_i$ is outside the confidence interval it is rejected. The confidence interval can be represented by the two equations below:

$$\text{Abs}(\mu_{\Delta,n} - \Delta_i) < k_1 * s_{\Delta,n} \text{ (dynamic interval)}$$

$$\text{Abs}(\Delta_i) < k_2 \text{ (hard limit interval)}$$

wherein the dynamic interval is an adaptive limit which compares the different measured delays with each other and the hard limit interval is a predetermined interval based on how long of a network delay will still provide a accurate data for the receiving node. If a transmission delay $\Delta_i$ is not within both the dynamic interval and the hard limit interval, then the time stamp message sent during the ith time stamp message exchange is discarded. $k_1$ and $k_2$ can be predefined or vary with the uncertainty of node A's estimate of the absolute time, $P_{11}$, as described below, and/or previous knowledge of the network. If too many time stamp messages are not within the confidence interval then it is determined that there is too much variance in the network delay to properly synchronize the two nodes and a new time stamp message exchange period is initiated.

After verification of the transmission delay, a new average and transmission delay is calculated for all of the time stamp messages which are within the confidence interval using the equation below:

$$\mu'_{\Delta,n} = \frac{1}{N'_1} \sum_{\Omega_\Theta} \Delta_i \tag{19}$$

wherein $\Omega_1$ represents the set of the time stamp messages which are within the above described confidence interval during the ith time stamp exchange. $\Omega_1$ can $$\Omega_1 \{I \epsilon Z; (n-1)*N < i \leq n*N\} \cap \{i \epsilon Z; \Delta_i \text{ rejected}\} \tag{20}$$

be represented by the equation below:

$N_1'$ represents the time stamp messages which are within the set of $\Omega_1$.

The uncertainty of the transmission delay is now calculated for all the time stamp messages which are within the confidence interval. The uncertainty of the transmission delay can be represented by the variance calculation in the equation $$\sigma^2_{\Delta,n} = \frac{1}{N'_1 - 1} \sum_{\Omega_1} (\Delta_i - \mu'_{\Delta,n})^2 \tag{21}$$

below:

where $\Omega_1$ is a group which includes all of the $\Delta$ values which were found to be within the confidence interval for the nth time stamp exchange period.

Now that the transmission delay of the network has been calculated, the Kalman observer will calculate the frequency deviation of the oscillator in the node. The frequency difference between the two nodes is measured by interchanging their measurements of a common interval, $I_i$ and $J_i$, as illustrated in FIG. 3A. Since the absolute time changes at every interchange of time stamp messages, it cannot be used for expressing interval length. Instead, the counter in the node is used together with the estimated frequency offset. At transmission of the time stamp, $t_{t,i}$ and $\tau_{t,i}$, the counter value of the nodes is saved in both nodes. N time stamp messages after that, the measured interval is interchanged. Any difference of the measurements of the common intervals, after compensation for transmission delay and reply time $O_i$, originates from a frequency deviation between the nodes. The frequency deviation in fractions of the frequency for the ith time stamp message is $y_{2,i}$ and can be expressed using the equation below:

$$y_{2,i} = \frac{I_i - J'_i}{\hat{I}_i} \tag{22}$$

wherein $I_i$ represents node A's estimate of the interval length for the ith time stamp message, $\hat{I}_i$ represents the estimated true interval length for the ith time stamp message based on both $I_i$ and $J_i$, and $J_i$ represents node B's estimate of the interval length for the ith time stamp message.

$\hat{I}_i$ and $J_i'$ can be expressed using the equations below:

$$\hat{I}_i = pJ_i' + (1-p)I_i \tag{23}$$

$$J_i' = (J_i - O_i - \Delta_i + O_{i-N+1} + \Delta_{i-N+1}) \tag{24}$$

wherein p represents the ratio between the uncertainty of the estimation of the interval length at node A and the uncertainty of the interval length at node B for the ith time stamp message and can be expressed using the equation below:

$$p = \text{Var}(I_i)/(\text{Var}(I_i) + \text{Var}(J_i')) \tag{25}$$

wherein $\text{Var}(I_i)$ is the variance of node A's estimate of the interval length from the true interval length for the ith time stamp message, i.e., the value of the uncertainty, and $\text{Var}(J_i')$ represents the variance of node B's estimate of the interval length from the true interval length for the ith time stamp message. The variation of node B's estimate of the interval length for the ith time stamp message can be represented by the equation below:

$$\text{Var}(J_i') = \text{Var}(J_i) + \text{Var}(O_i) + \text{Var}(\Delta_i) + \text{Var}(O_{i-N+1}) + \text{Var}(\Delta_{i-N+1}) \approx \text{Var}(J_i) + \sigma^2_{\Delta,n} + \sigma^2_{\Delta,n-1} \tag{26}$$

Accordingly, $\text{Var}(J_i')$ is approximately equal to the variance of $J_i$ plus the uncertainty of the transmission at time n and time n−1.

$J_i$ and $\text{Var}(J_i)$ are included in the reply time stamp messages. The last approximation is valid if the reply time of the time stamp message is small compared to the interval.

The calculation of the variance of $y_{2,i}$ assumes that all variables are uncorrelated. It also divides the stochastic variables into a sum of a scalar and a normal distributed signal with zero expected value and the variance of the original stochastic variable as illustrated by the equations below:

$$I_i \equiv \mu_{\Delta,i} + \upsilon_{\Delta,i}$$

$$I_i \in N(\mu_{\Delta,i}, \sigma_{\Delta,i})$$

$$\mu_{\Delta,i} \in \Re^1$$

$$\upsilon_i \in N(0, \sigma_{\Delta,i})$$

$$\text{Var}(y_{2,i}) = \text{Var}\left(\frac{I_i - J_i'}{\mu_{f,i} + \upsilon_{f,i}}\right)$$

$$= \text{Var}\left(\frac{1}{\mu_{f,i}}(I_i - J_i')\left(1 - \frac{\upsilon_{f,i}}{\mu_{f,i}} + O\left(\frac{\upsilon^2_{f,i}}{\mu^2_{f,i}}\right)\right)\right)$$

$$\approx \frac{1}{\mu^2_{f,i}} \text{Var}\left((I_i - J_i')\left(1 - \frac{p\upsilon_{J',1} + (1-p)\upsilon_{I,i}}{\mu^2_{f,i}}\right)\right)$$

$$= \frac{1}{\mu^2_{f,i}}\left(\text{Var}(I_i) + \text{Var}(J_i') + \frac{1}{\mu^2_{f,i}}(\text{Var}((1-p)I_i\upsilon_{I,i}) + \text{Var}(pJ_i'\upsilon_{J',i}))\right)$$

$$\text{Var}(J_i') \approx \text{Var}(J_i) + \sigma^2_{\Delta,n} + \sigma^2_{\Delta,n-1}$$

-continued $$\operatorname{Var}(I_i v_{I,i}) = \mu_{I,i}^2 \operatorname{Var}(v_{I,i}) + \operatorname{Var}(v_{I,i}^2) \approx \mu_{I,i}^2 \operatorname{Var}(v_{I,i})$$
$$= \mu_{I,i}^2 \operatorname{Var}(I_i)$$

$$\operatorname{Var}(J_i' v_{J,i}) = \operatorname{Var}((\mu_{J',i} + v_{J',i})v_{J',i})$$
$$= \mu_{J',i}^2 \operatorname{Var}(v_{J',i}) + \operatorname{Var}(v_{J',i}^2)$$
$$\approx \mu_{J',i}^2 \operatorname{Var}(v_{J',i}) = \mu_{J',i}^2 \operatorname{Var}(J_i')$$

$$\operatorname{Var}(y_{2,i}) \approx \frac{1}{\mu_{f,i}^4} \big( (\mu_{f,i}^2 + (1-p)^2 \mu_{f,i}^2) \operatorname{Var}(I_i) +$$
$$(\mu_{f,i}^2 + p^2 \mu_{J',i}^2)(\operatorname{Var}(J_i) + \sigma_{\Delta,n}^2 + \sigma_{\Delta,n-1}^2) \big)$$

$$\mu_{y,2,n} = \frac{1}{N} \sum_{\Omega_\Theta} y_{2,i}$$

$$s_{y,2,i}^2 = \frac{1}{N} \sum_{\Omega_\Theta} \operatorname{Var}(y_{2,i})$$

Each frequency deviation estimate $y_{2,i}$ for the ith time stamp message is now checked against a confidence interval to ensure that time stamp messages which were stuck in the network are not included in the algorithm, the confidence interval can be represented by the equations below:

$$\operatorname{Abs}(\mu_{y,2,n} - y_{2,i}) < k_3 * s_{y,2,i} \text{ (dynamic interval)}$$

$$\operatorname{Abs}(y_{2,i}) < k_4 \text{ (hard limit interval)}$$

where $k_3$ and $k_4$ can be predefined or vary with $P_{22}$ and/or previous knowledge of the surrounding nodes. Time stamp messages which are not within both the dynamic interval and the hard limit interval are discarded. Typically, $k_4$ varies with the uncertainty of the frequency error, $P_{22}$, and the known maximum possible frequency deviation of the oscillator over time. If too many time stamp messages were thrown away, the processing ends and a new time stamp message exchange period is initiated.

A frequency deviation estimate $y_{2,k}$ is now calculated for all N time stamp exchange periods by taking the average of the frequency deviations:

$$y_{2,k} = \frac{1}{N_2'} \sum_{\Omega_\theta} y_{2,i} \qquad (27)$$

wherein $\Omega_2$ represents the set of time stamp messages which are within the confidence interval during the kth iteration of the Kalman observer and can be represented by the equation below:

$$\Omega_2 = \{i \epsilon Z; (n-1)*N < i \leq n*N\} \cap \{i \epsilon Z; y_{2,i} \text{ rejected}\} \cap \{i \epsilon Z; \Delta_i \text{ rejected}\} \qquad (28)$$

$$N_2' = \text{Entries in } \Omega_2 \qquad (29)$$

Next the variance of the frequency deviation for the kth iteration of the Kalman observer is calculated using the equation below:

$$\operatorname{Var}(y_{2,k}) = \operatorname{Var}\left(\frac{1}{N_2'} \sum_{\Omega_\theta} y_{2,i}\right) \qquad (30)$$

wherein the variance of the frequency measurement for the kth iteration of the Kalman observer $\operatorname{Var}(y_{2,k})$ is equal to the variance of the sum of the frequency deviation measurements which are within the confidence interval for all i time stamp messages.

The measurement $y_{2,k}$ is the average frequency deviation for the kth iteration of the Kalman observer in fractions during the time interval. Assuming a linear frequency deviation of the oscillator over time, $y_{2,k}$ is the frequency deviation at the mid point of the Kalman observer iteration interval, i.e. the new frequency estimated is the frequency deviation at the middle of the interval. The mid point of the interval is therefore called the frequency point and can be calculated using the formula below:

$$FP = \frac{1}{N_2'} \sum_{\Omega_2} \left( t_{t,i} - \frac{1}{2} I_i \right) \qquad (31)$$

As will be described in more detail below the state variable of the last frequency point is used iterate to the new frequency point. In the last iteration step, the measurement $y_{2,k}$ for the kth iteration of the Kalman observer and the variance of the measurement $y_{2,k}$ are used to update the variables of the state model of the system.

As described above in connection with FIG. 4B, the last two messages transmitted between the nodes during a message exchange interval is the absolute time message. The node's counter value is used as the relative time sampled at transmission and reception of time stamp messages. Based on the information received in the absolute time message after the N time stamp messages, all counter values received can be converted to absolute time. Based on the updated frequency estimate, the node's own counter values can be converted to absolute time.

The measurement $y_{1,i}$ is the estimated absolute time of node B at the time of transmission of the ith time stamp message by node A, i.e. $t_{i,t}$, the absolute time of transmission of the ith time stamp message can be represented the equation below:

$$y_{1,i} = \tau_{i,t} - O_i - \Delta_{i,1} \approx \tau_{i,t} - O_i \Delta_i \qquad (32)$$

Next the variance of the absolute time of transmission for the ith time stamp message is calculated and can be represented by the equation below:

$$\operatorname{Var}(y_{1,i}) \approx \sigma_\tau^2 + \operatorname{Var}(O_i) + \operatorname{Var}(\Delta_i) \qquad (33)$$

The innovation $\eta_{1,i}$ is the difference in absolute time between node A and node B. It, and its variance can be expressed by the equations below:

$$\eta_{1,i} = y_{1,i} - x_{1,i} = \tau_{i,t} - O_i - \Delta_i - t_{i,t} \qquad (34)$$

$$\operatorname{Var}(\eta_{1,i}) = \sigma_\tau^2 + \operatorname{Var}(O_i) + \operatorname{Var}(\Delta_i) + \operatorname{Var}(t_{i,t}) \qquad (35)$$

The average absolute time and the variance of the absolute time for all n time stamp message exchange periods can be expressed by the equations below:

$$\mu_{\eta,1,n} = \frac{1}{N} \sum_{(n-1)*N+1}^{n*N} \eta_{1,i} \qquad (36)$$

$$s_{\eta,1,i}^2 = \frac{1}{N} \sum_{(n-1)*N+1}^{n*N} \operatorname{Var}(\eta_{1,i}) \qquad (37)$$

Since the time between the first time stamp message and its reply, $O_i$, is small, its variation is neglected. Since all N time stamp messages are transmitted during a short time period, the same variance of the estimate of absolute time can be used for all N time stamp message. Alternatively, if the system is built for which this approximation is inappropriate, the absolute time message must consist of all these variances. The variance of node A's estimate of absolute time is $P_{11}$. The variance of node B estimate of absolute time, $\sigma_\tau^2$, is received in the Absolute Time message.

Each innovation $\eta_{1,i}$ is checked against a confidence interval to ensure that time stamp messages stuck in the network are not included in the determination of absolute time. The confidence interval can be represented by the equations below:

$$\text{Abs}(\mu_{\eta,1,n} - \eta_{1,i}) < k_5 * s_{\eta,1,i}, \text{ (dynamic interval)}$$

$$\text{Abs}(\eta_{1,i}) < k_6 \text{ (hard limit interval)}$$

where $k_5$ and $k_6$ can be predefined or vary with the uncertainty of node A's estimate of the absolute time $P_{11}$, and/or previous knowledge of the network.

One innovation is now calculated for all N time stamp messages by taking the average innovation for all time stamp messages:

$$\varepsilon_{1,k} = \frac{1}{N_3'} \sum_{\Omega_\theta} \eta_{1,i} \quad (38)$$

The innovation of absolute time is valid at the time point. $\Omega_3$ is the set of all time stamp messages which are within the confidence interval and can be represented by the equation below:

$$\Omega_3 = \{i \in Z; (n-1)*N < i \leq n*N\} \cap \{i \in Z; \eta_{1,i} \text{rejected}\} \cap \{i \in Z; \Delta_i \text{rejected}\} \quad (39)$$

$$N_3' = \text{Entries in } \Omega_3 \quad (40)$$

Next, the uncertainty of the node's estimation of the absolute time is calculated. The uncertainty of the node's estimation of the absolute time can be represented by the variance equation below:

$$\text{Var}(\varepsilon_{1,k}) = \text{Var}\left(\frac{1}{N_3'} \sum_{\Omega_I} \eta_{1,i}\right) = \frac{1}{N_3'} \text{Var}(\eta_i) = \frac{1}{N_3'}(\sigma_\tau^2 + \sigma_{\Delta,n}^2 + P_{11}) \quad (41)$$

The estimated state variable, including absolute time, at the time point was estimated after updating the state variable at the new frequency point. It is now updated at the time point by using the innovation $\epsilon_n$ and its variance, and $T_k$ set to 0. The new state variable $x_1$ and the matrix component $P_{11}$ then become the optimal estimate of absolute time and the node's uncertainty of the absolute time.

By calculating and distributing the estimated transmission delay, a comparison of a common time and a common interval can be made (except for the variations of the transmission delay). Note that the time $O_i$ of the replying node must be short enough not to cause any extra uncertainties due to the oscillator drift of that node.

The exchange of time stamp messages and the calculations of absolute time and frequency deviation have, for ease of illustration, been described above as involving only two nodes. However, as described above in connection with FIG. 1, a node may exchange time stamp messages with several nodes. For example, referring now to FIG. 1, node A may exchange time stamp messages with node B and node C. However, the exchange of time stamp messages between nodes A and B may occur more frequently than the exchange of time stamp messages between nodes A and C. Accordingly, the time period for the exchange of time stamp messages between nodes A and B will be shorter than the time period for the exchange of time stamp messages between nodes A and C.

FIG. 10 illustrates the frequency deviation of node A's oscillator and the time and frequency points for the exchange of time stamp messages with nodes B and C. Time points $TP_{AB1}$, $TP_{AB2}$, $TP_{AB3}$ and $TP_{AB4}$ represent time points in the exchange of time stamp messages between nodes A and B and time point $TP_{AC1}$ represents a time point in the exchange of time stamp messages between nodes A and C. As described above, at each time point in the exchange of time stamp messages between nodes A and B, i.e., $TP_{AB1}$, $TP_{AB2}$, $TP_{AB3}$ and $TP_{AB4}$, node A will adjust the frequency of its oscillator based upon the estimated frequency deviation. Accordingly, during the time period between time 0 and time point $TP_{AC1}$ node A will have adjusted its oscillator for frequency drift three times, i.e., at time points $TP_{AB1}$, $TP_{AB2}$ and $TP_{AB3}$. Therefore, to properly determine the absolute time between time 0 and time point $TP_{AC1}$, the Kalman observer will have to take into consideration the frequency adjustment at time points $TP_{AB1}$, $TP_{AB2}$, $TP_{AB3}$. Using the calculated absolute time between time 0 and time point $TP_{AC1}$ the Kalman observer can estimate the frequency drift of node A's oscillator during this time period.

Figure 11A:
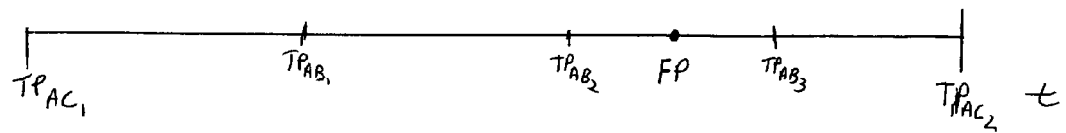
FIG. 11a illustrates a frequency point in a time stamp exchange between two nodes relative to a time stamp exchange with a third node.

FIG. 11a illustrates a plurality of time points in message exchanges between node A and nodes B and C. FIG. 11a illustrates time stamp message exchanges between nodes A and B delimited by time points $TP_{AB1}$, $TP_{AB2}$, $TP_{AB3}$, and a time stamp message exchanges between nodes A and C message delimited by time points $TP_{AC1}$ and $TP_{AC2}$. Assume that frequency point FP was calculated during a time stamp message exchange period between nodes A and B during the time period delimited by $TP_{AB2}$ and $TP_{AB3}$. Now assume that node A has performed a time stamp message exchange with node C, during the time interval between time points $TP_{AC1}$ and $TP_{AC2}$. As discussed above with regard to FIG. 8, in step 815 the interval in time between the transmitted message and the message transmitted N time ago is calculated using the Kalman observer. However, the current frequency point is in the middle of the time stamp message exchange between nodes A and B. Accordingly, it is necessary to determine the interval between the time points $TP_{AC1}$ and $TP_{AC2}$.

Figure 12:
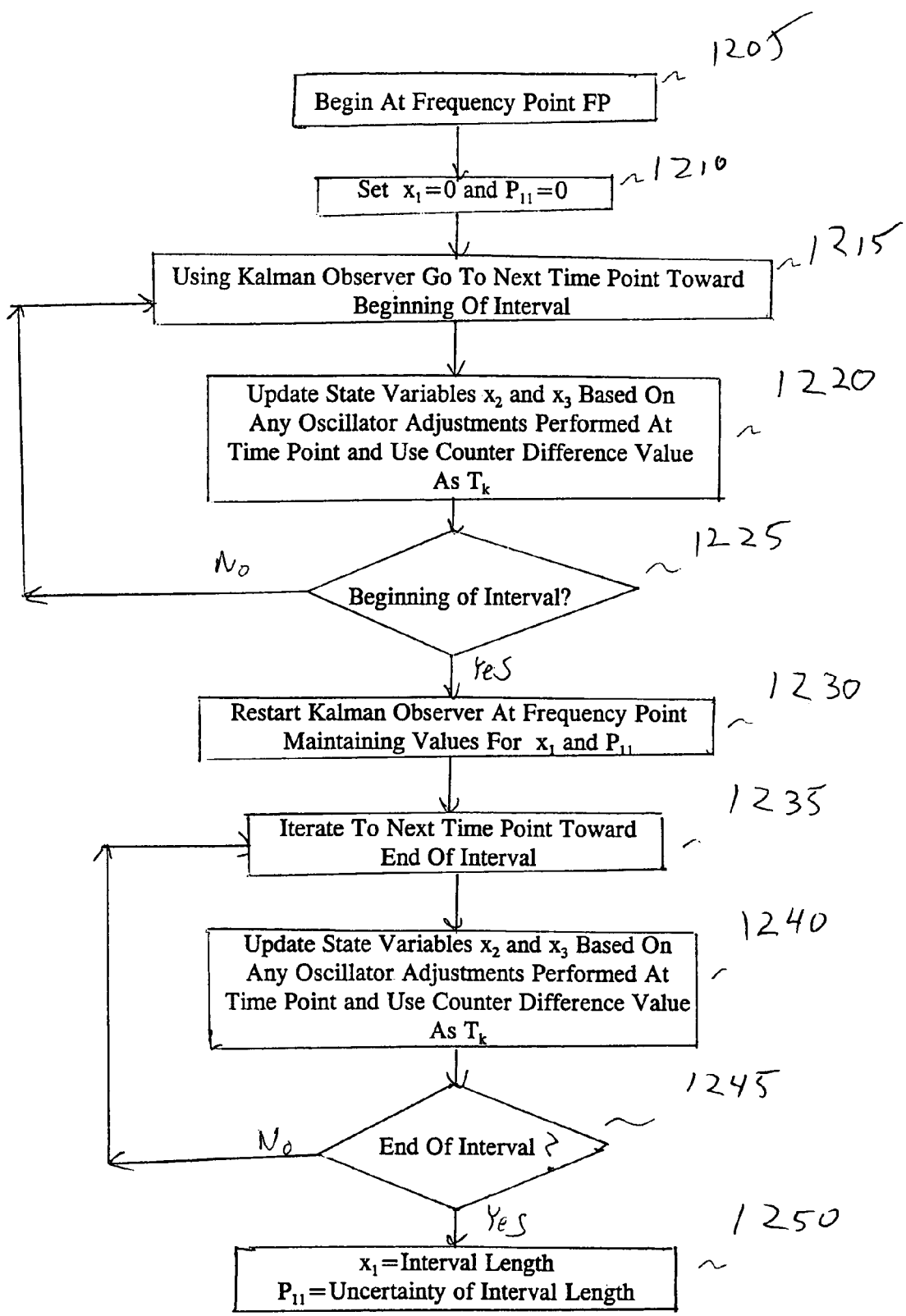
FIG. 12 illustrates an exemplary method for estimating an interval which includes a frequency point.

FIG. 12 illustrates an exemplary method for estimating a time interval during a time stamp message exchange between two nodes, delimited by two time points, using a frequency point which was determined based on a time stamp message exchange with a third node. In step 1205 the Kalman observer begins from the frequency point. In step 1210 the Kalman observer sets the estimation of the absolute time x, and the uncertainty of the estimation of the absolute time $P_{11}$ equal to zero. In step 1215 the Kalman observer iterates towards the beginning of the interval to the next time point. In step 1220 the Kalman observer updates the state variables $x_2$ and $x_3$ and their respective uncertainty values $P_{22}$ and $P_{33}$ based on any adjustment of the oscillator frequency performed at the time point. The Kalman observer uses the difference in counter values between the time points as the number of oscillator cycles between two update, $T_k$.

Since the Kalman observer is iterating backwards towards the beginning of the interval, $T_k$ will be negative in this step. In step 1225 the Kalman observer determines whether the current time point is the time point at the beginning of the interval.

If the time point is not the time point at the beginning of the interval, in accordance with the "No" path out of decision step 1225, the Kalman observer iterates towards the beginning of the interval to the next time point. If the time point is at the beginning of the interval, in accordance with the "Yes" path out of decision step 1225, the Kalman observer restarts at the frequency point and maintains the values of $x_1$ and $P_{11}$ in accordance with step 1230.

In step 1235 the Kalman observer iterates towards the end of the interval to the next time point. At this time point the Kalman observer updates the state variables frequency error $x_2$, the frequency drift per time unit $x_3$ and their respective uncertainty values $P_{22}$ and $P_{33}$ based on any adjustment of the oscillator frequency performed at the time point in accordance with step 1240. The Kalman observer uses the difference in counter values between the time points as the number of oscillator cycles between two updates, $T_k$. In step 1245 the Kalman observer determines whether the current time point is at the end of the interval. If the time point is not at the end of the interval, in accordance with the "No" path out of decision step 1245, the Kalman observer iterates towards the end of the interval to the next time point in accordance with step 1235. If the time point is at the end of the interval, in accordance with the "Yes" path out of decision step 1245, then the value of $x_1$ is used as the interval length and the value of $P_{11}$ is used as the uncertainty of the interval length in accordance with step 1250.

Figure 11B:
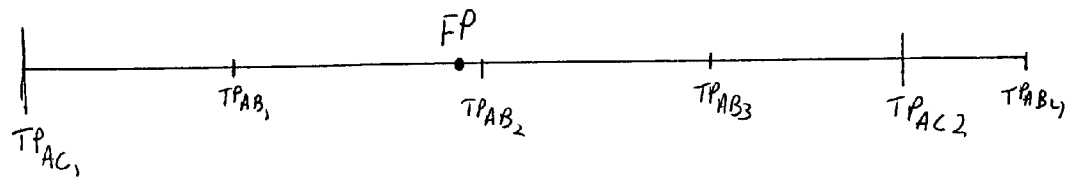
FIG. 11b illustrates another frequency point in a time stamp exchange between two nodes relative to a time stamp exchange with a third node.

Now assume that node A has adjusted the frequency point of the Kalman observer based on a time stamp message exchange with node C, as illustrated by the frequency point FP in FIG. 11*b*. When node A finishes a time stamp message exchange with node B, e.g., at time point $TP_{AB4}$, the node will have to estimate the interval between time points $TP_{AB3}$ and $TP_{AB4}$. However, in this case the frequency point is not in the interval between $TP_{AB3}$ and $TP_{AB4}$.

Figure 13:
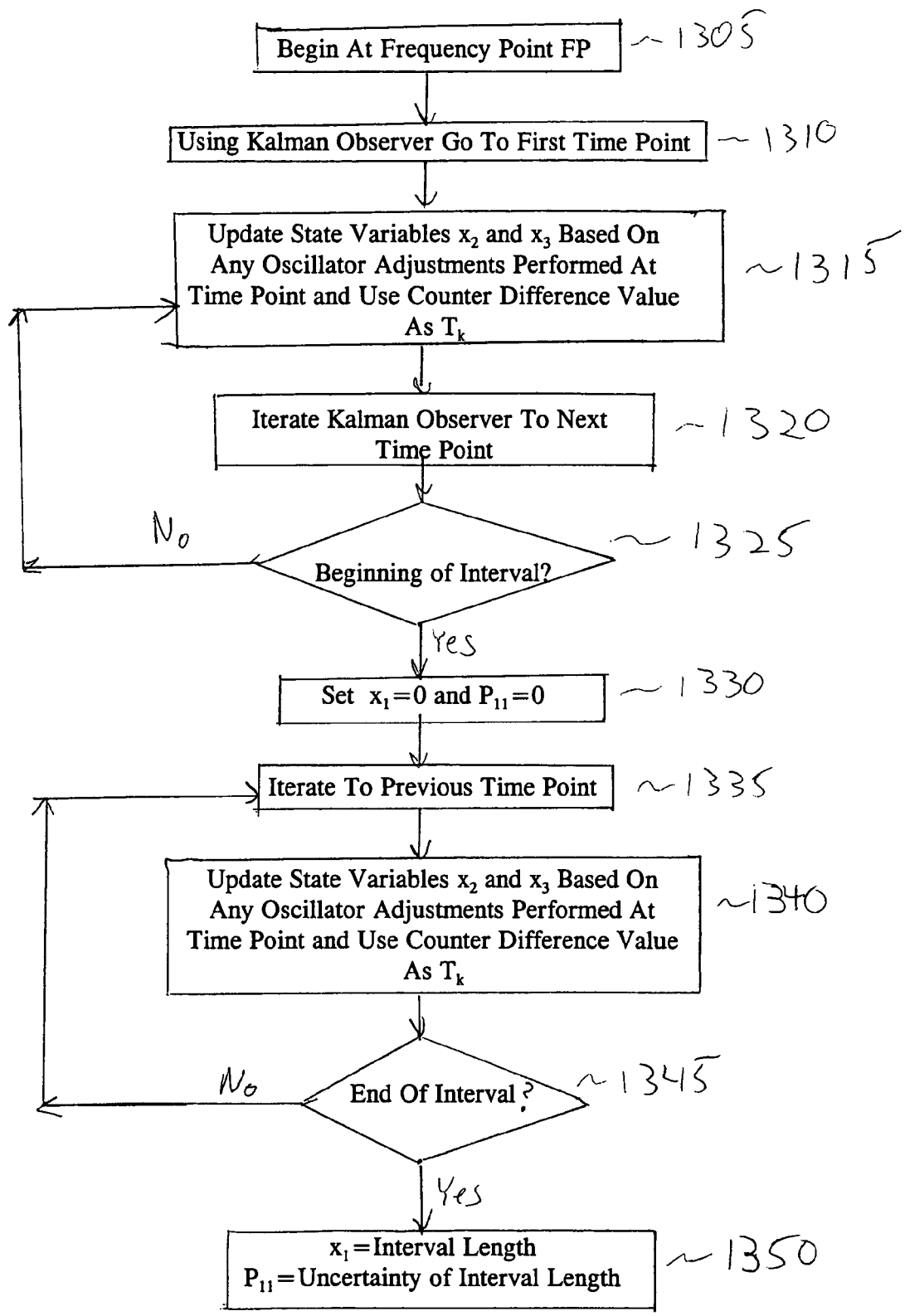
FIG. 13 illustrates an exemplary method for estimating an interval which begins after a frequency point.

FIG. 13 illustrates an exemplary method for estimating an interval when the frequency point is not within the interval. In step 1305 the Kalman observer begins at the frequency point. In step 1310 the Kalman observer iterates to the first time point after the frequency point. In step 1315 the Kalman observer updates the state variables $x_2$ and $x_3$ and their respective uncertainty values $P_{22}$ and $P_{33}$ based on any adjustment of the oscillator frequency performed at the time point. The Kalman observer uses the difference in counter values between the time points as the number of oscillator cycles between two updates, $T_k$. In step 1320 the Kalman observer iterates to the next time point. In step 1325 the Kalman observer determines whether this time point is at the beginning of the interval.

If the time point is not at the beginning of the interval, in accordance with the "No" path out of decision step 1325, the Kalman observer updates the state variables $x_2$ and $x_3$ and their respective uncertainty values $P_{22}$ and $P_{33}$ based on any adjustment of the oscillator frequency performed at the time point and uses the difference in counter values between the time points as $T_k$ in accordance with step 1315. If the time point is at the beginning of the interval, in accordance with the "Yes" path out of decision step 1325, the Kalman observer sets the interval length $x_1$ and the variance of the interval length $P_{11}$ equal to zero in accordance with step 1330.

The Kalman observer then begins to iterate towards the end of the interval. Accordingly, in step 1335 the Kalman observer iterates to the previous time point. In step 1340 the Kalman observer updates the state variables $x_2$ and $x_3$ and their respective uncertainty values $P_{22}$ and $P_{33}$ based on any adjustment of the oscillator frequency performed at the time point. The Kalman observer uses the difference in counter values between the time points as the number of oscillator cycles between two updates, $T_k$. In step 1345 the Kalman observer determines whether the time point it is currently at is the end of the interval.

If the time point which the Kalman observer is currently at is not the time point at the end of the interval, in accordance with the "No" path out of decision step 1345, the Kalman observer iterates to the next time point on the way to the end of the interval in accordance with step 1335. If the Kalman observer is at the time point which is at the end of the interval, in accordance with the "Yes" path out of decision step 1345, then the value of $x_1$ is used as the interval length and the value of $P_{11}$ is used as the variance of the interval length in accordance with step 1350.

Figure 14:
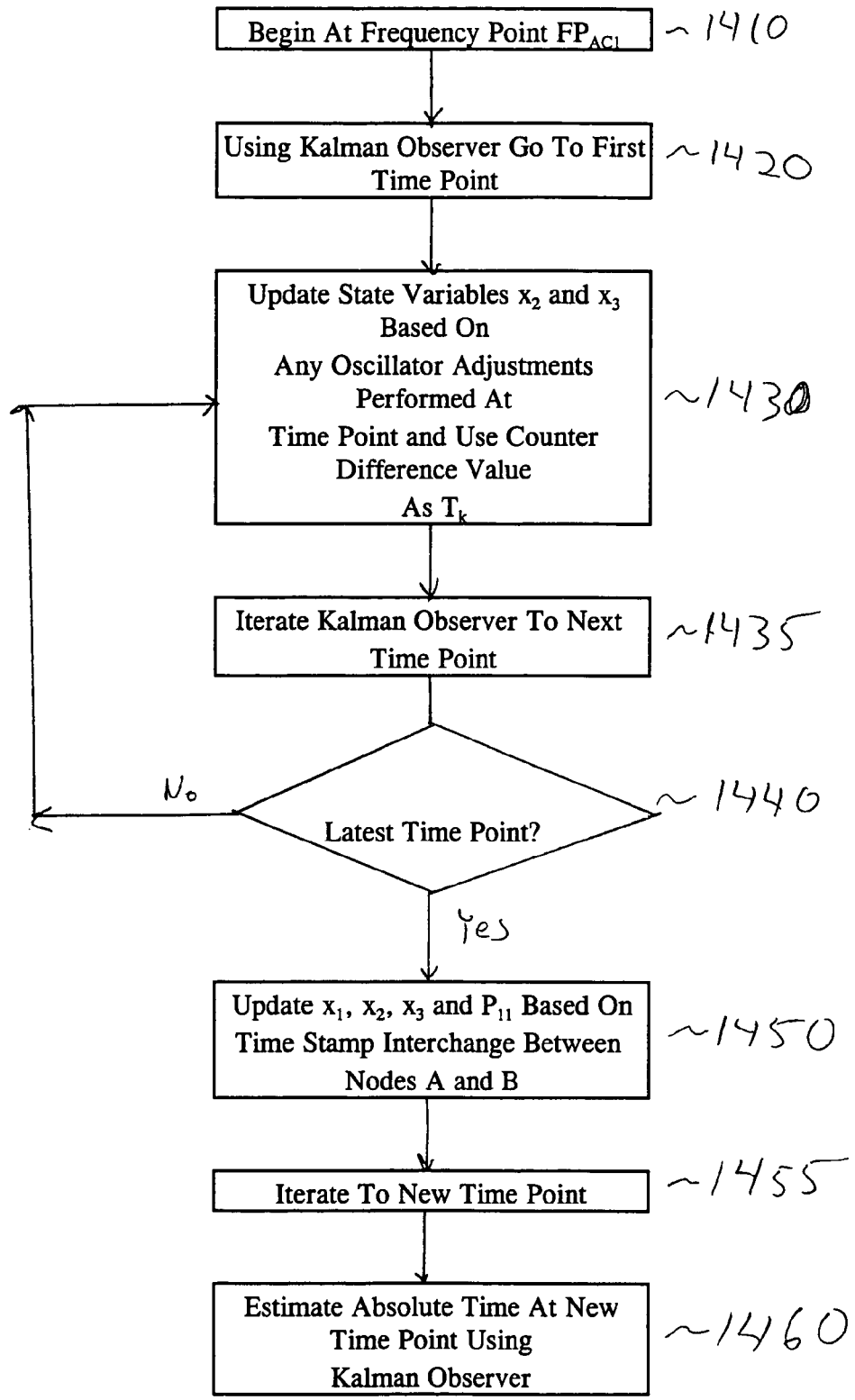
FIG. 14 illustrates an exemplary method for estimating the absolute time of an interval between time stamp exchanges.
Figure 15:
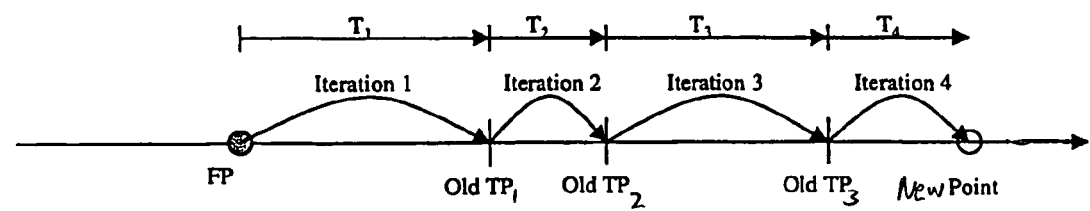
FIG. 15 illustrates iterations of the Kalman observer from a frequency point to a new time point.

As discussed above with respect to FIG. 8, in step 850 the absolute time of transmission of first time stamp message during a time stamp message exchange is calculated. FIGS. 14 and 15 illustrate the estimation of the absolute time for a time point in an exchange of time stamp messages between, for example, nodes A and C, when node A has performed several time stamp exchanges with node B during the time period of the time stamp message exchange between nodes A and C. Referring now to FIG. 14, in step 1410 the Kalman observer begins at the frequency point (FP of FIG. 15) of the time period between the end of last time stamp message exchange between nodes A and C (not shown in FIG. 15) and the end of the current time stamp message exchange between nodes A and C (New Point in FIG. 15).

In step 1420 the Kalman observer performs an iteration from the frequency point (FP in FIG. 15) to the next time point after the frequency point (Old $TP_1$ of FIG. 15). This is illustrated in FIG. 15 as Iteration 1. In step 1430 the Kalman observer updates the state variables $x_2$ and $x_3$ and their respective uncertainty values $P_{22}$ and $P_{33}$ based on any adjustment of the oscillator frequency performed at the time point. The Kalman observer will then use the difference in counter value as the number of oscillator cycles between two updates, $T_k$. In step 1435 the Kalman observer iterates to the next time point. In step 1440 it is determined whether this time point is the latest time point for which the state variables have been updated. For example, referring now to FIG. 15, if the Kalman observer advances from Old $TP_1$ to Old $TP_2$, then Old $TP_2$ is not the latest time point. However, if the Kalman observer iterates from Old $TP_2$ to Old $TP_3$, then Old $TP_3$ is the latest time point.

Accordingly, if the Kalman observer determines that this time point is not the latest time point, in accordance with the "No" path out of decision step 1440, the Kalman observer will update the state variables $x_2$ and $x_3$ and their respective uncertainty values $P_{22}$ and $P_{33}$ based on any adjustment of the oscillator frequency performed at the time point use the difference in counter value as $T_k$ in accordance with step 1430. If the Kalman observer determines that the time point is the current time point, in accordance with the "Yes" path out of decision step 1440, the Kalman observer will update $x_1$, $x_2$, $x_3$ and $P_{11}$ based on the time stamp exchange between nodes A and B in accordance with step 1450. In step 1455 the Kalman observer iterates from the latest time point to the current time point. In step 1460 the Kalman observer will determine the absolute time of the time period ending at New Time point using a Kalman iteration.

Figure 16:
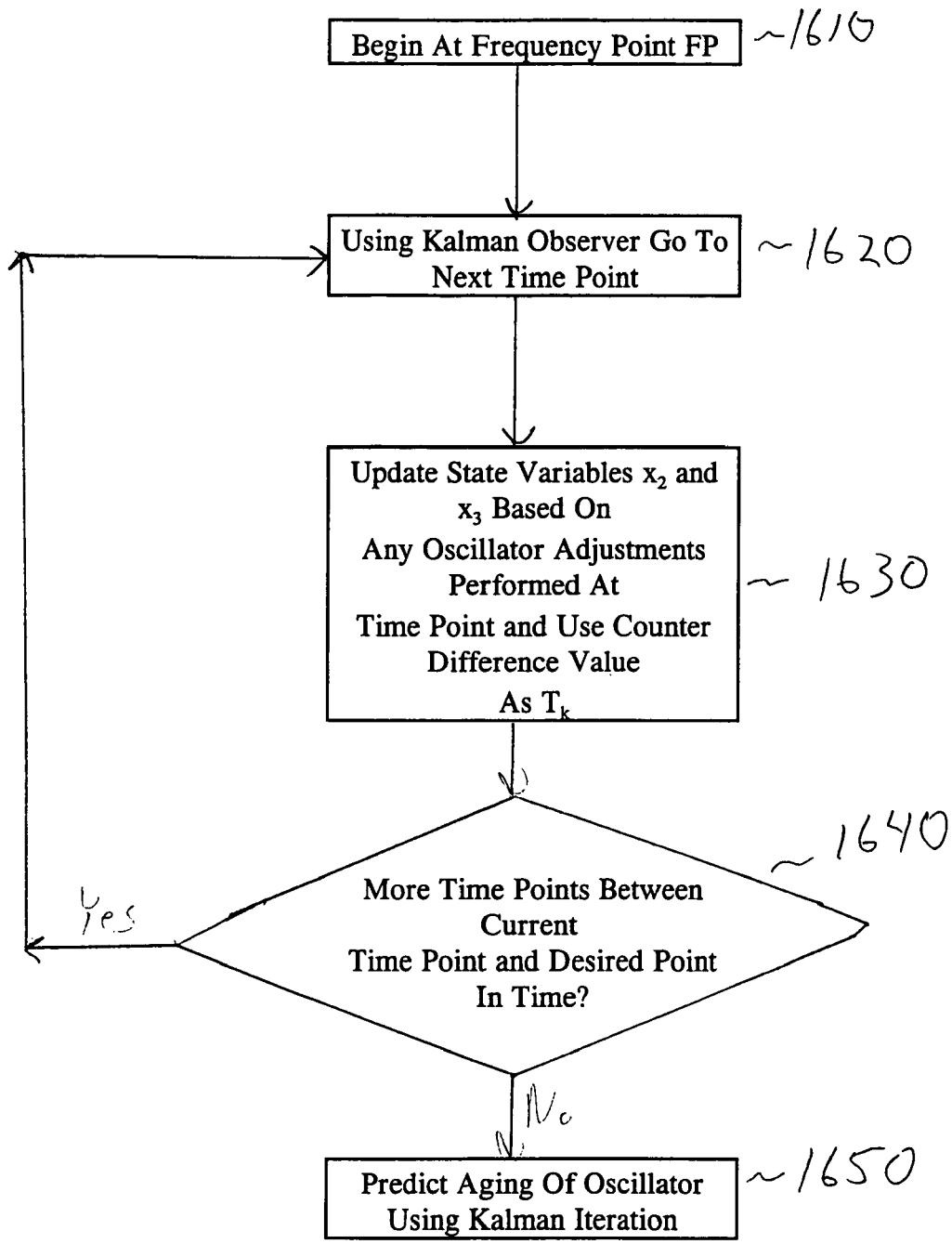
FIG. 16 illustrates an exemplary method for estimating the aging of an oscillator.

FIG. 16 illustrates an exemplary method for estimating the frequency of the oscillator at a desired point in time. In step 1610 the Kalman observer begins at the frequency point. In step 1620 the Kalman observer iterates to the first time point after the frequency point. In step 1630 the Kalman observer updates the state variables $x_2$ and $x_3$ and their respective uncertainty values $P_{22}$ and $P_{33}$ based on any adjustment of the oscillator frequency performed at the time point. The Kalman observer uses the difference in counter values between the time points as the number of oscillator cycles between two updates, $T_k$. In step 1640 the Kalman observer determines whether there are more time points between the current time point and the desired point in time. If there are more time points between the current time point and the desired point in time, in accordance with the "Yes" path out of decision step 1640, the Kalman observer iterates to the next time point in accordance with step 1620. If there not any more time points between the current time point and the desired point in time, in accordance with the "No" path out of decision step 1640, the Kalman observer will estimate the frequency of the oscillator at the desired point using the updated state variable.

Once the frequency of the oscillator is determined at a point in time and the variance of the oscillator from the estimated frequency has been determined, the oscillators frequency is updated. The regulation of the voltage controlled oscillator can be performed using a simple PI regulator based on the estimated frequency error, state variable $x_2$. Of course, one skilled in the art will recognize that other types of regulators can be implemented to update the frequency of the oscillator.

The Kalman observer will first estimate the frequency deviation. Based on the estimated frequency deviation, the regulator will update the oscillator accordingly. For example, a simple regulator can be represented by the equation $V_{VCO}=V_{VCO}+k_7*k_8*x_2$, where $k_7$ is the proportional constant "volts/frequency fraction", and $k_8$ represents the cut-off frequency of the regulator. After the frequency deviation of the oscillator is updated the node will store the updated frequency, which can be represented by the equation FreqCorrection:=$k_8*x_2$.

As described above, every time an estimation of time or frequency passes the point of where the control voltage was updated, e.g., a time point, the state variables $x_2$ and $x_3$ as well as the uncertainty of the estimation of the state variables $P_{22}$ and $P_{33}$ are updated. The updates of these variable can be represented by the equations below:

$$x_2=x_2-\text{FreqCorrection}(+\text{FreqCorrection if backwards in time}) \quad (42)$$

$$P_{22}=P_{22}+\text{FreqCorrection}^2*\text{Var}(k_7) \quad (43)$$

Changes to $x_3$ and $P_{33}$ will depend on the type of oscillator used in the node. One method for modeling the drift of the oscillator's frequency is to assume that the drift in hertz per second continues independent on changes in control value, and leave $x_3$ and $P_{33}$ unchanged.

Up to this point it has been assumed that the absolute time and the deviation of the frequency provide an acceptable estimate for correcting the frequency deviation of the oscillator. However, if a node is exchanging time stamp messages with a node with an inaccurate oscillator, the absolute time and estimated deviation of the frequency will be incorrect and using these values will cause the node's oscillator to drift farther from the correct frequency. Accordingly, the node will supervise its state model to determine if the uncertainty of the frequency and the absolute time are within predefined limits. Exemplary equations for determining whether the uncertainty of the frequency and the absolute time are within predefined limits can be represented by the equations below:

$$\text{Abs}(x_2)+k_9*\sqrt{P_{22}}<k_{10} \quad (44)$$

wherein $k_9=1.65$ for 95% confidence and $k_{10}$ is the limit.

$$\text{Abs}(x_1)+k_{11}*\sqrt{P_{11}}<k_{12} \quad (45)$$

wherein $k_{11}=1.65$ for 95% and $k_{12}$ is the limit.

If $x_1$ and $x_2$ are not within the confidence interval, and if time stamp exchanges with other nodes does not correct the state variables within a predetermined period of time, the node sends an alarm to the operator. In response, the operator can then either chose to ignore the alarm, shut down the node or change the set of nodes with which the node may interchange time stamp messages with.

The node can also supervise the values predicted by the Kalman observer by checking that each of the received estimates are within a confidence interval.

$$\text{Abs}(\epsilon_{1,k})<k_{13}*(\sqrt{\text{Var}(\epsilon_{1,k})}) \quad (46)$$

wherein $k_{13}$ is set to 1.7 if N=30 and 95% confidence is desired.

$$\text{Abs}(y_{2,k}-x_2)<k_{14}*(\sqrt{\text{Var}(y_{2,k})+P_{22}}) \quad (47)$$

wherein $k_{14}$ is set to 1.7 if N=30 and 95% confidence is desired.

If the difference in absolute time or frequency is outside the confidence interval, an alarm is sent to the operator. The node itself will not be able to determine whether it, or its peer, has an accurate frequency. However, the operator can, based on the alarms received from all involved nodes, determine which node/nodes are probably malfunctioning. Alternatively, a node with a very stable frequency reference, such as a GPS receiver, can be used to determine if nodes are sending inaccurate estimations of absolute time and frequency. For example, the node with the very stable frequency reference can occasionally compare its estimation of a time interval with the other nodes estimation of the same time interval. Based this comparison, the node with the very stable oscillator can determine which nodes are providing frequency deviation estimates which are causing a group of nodes to drift farther from the correct frequency. The node with the very stable oscillator can then initiate a time stamp message with the nodes which are providing the inaccurate estimates to correct the frequency drift of these nodes.

Figure 17:
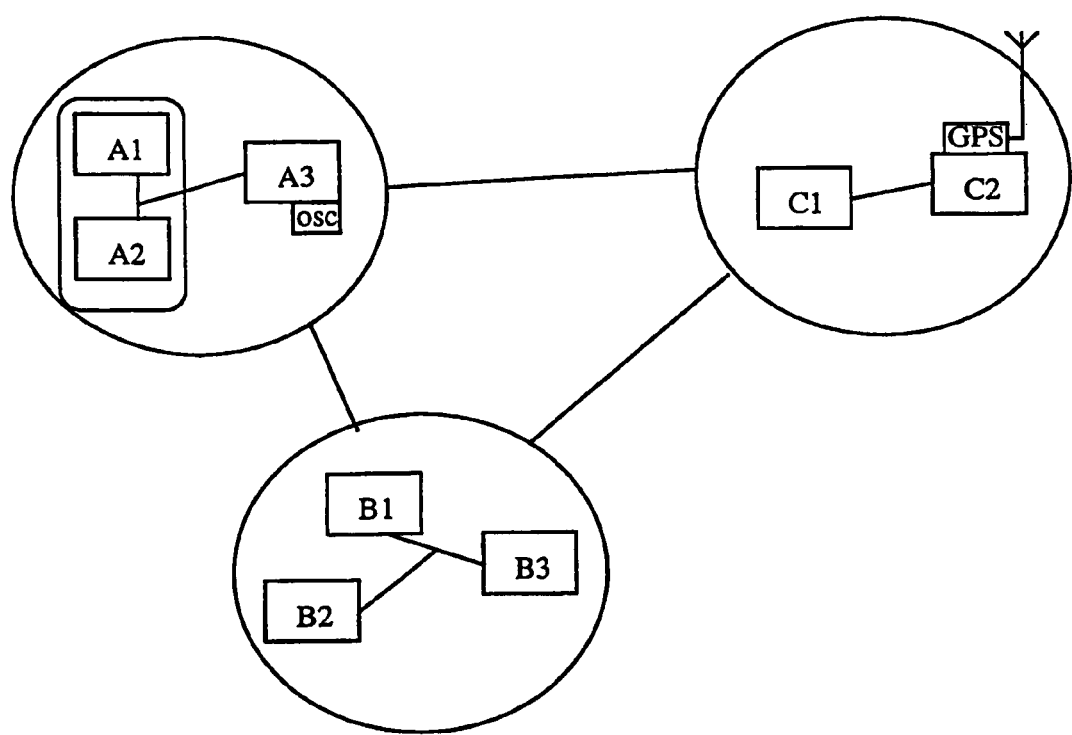
FIG. 17 illustrates an exemplary grouped network according to exemplary embodiments of the present invention.

FIG. 17 illustrates an exemplary grouped network for implementing the present invention. A grouped network is a network where nodes are grouped together and share a single synchronization source for synchronizing all of the radio base stations. Accordingly, time stamp messages can be exchanged between the groups to synchronize one group with another group.

Within a group, any type of synchronization reference can be used, e.g. an AC network or a physical frequency reference network. The absolute time, and if necessary, the absolute frequency of the internal reference, can be calibrated using the above described methods between the groups. If a group is in a building or any other well-defined sub-network, the present invention provides a good alternative for the internal synchronization of the group when the time stamping is done on physical layer.

In between calibration from the other groups, the frequency drift (and accumulation time drift) inside the group will be the average of the drift of all oscillators. Accordingly, in a group, the oscillators will tend to have the same frequency drift. Accordingly, if the nodes are radio base stations, a mobile would not have any problem performing a hand over within a group since all of the radio base stations within a group will have the same amount of frequency drift. Of course one skilled in the art will recognize that if the calibration between the groups has not occurred for some time the oscillator frequencies of the groups may drift apart and a mobile station may encounter handover problems in a handover between groups.

One advantage of grouped nodes is that if any of the nodes within an group is equipped with a better oscillator, all of the nodes in the group will have more accurate oscillators and the total drift of the group will be as good as the drift of the best oscillator. After the nodes have corrected their oscillators for the frequency drift, a system operator can monitor the uncertainties of frequency and absolute time for each group and add any necessary extra oscillators or absolute time servers to correct any deficiencies in the system.

The exchange of time stamp messages can improve the startup of a new node in a group. For example, assume that node A1 has just been placed in the system. Initially, node A1 receives a list of nodes, including expected transmission delays to each node, from the central node. Next, node A1 requests time stamp messages from A2 to quickly tune its oscillator.

According to the exemplary embodiment of FIG. 17, A3 contains a stratum 2 oscillator. Accordingly, A2 will be well tuned due to the exchange of time stamp messages with node A3. Since A1 and A2 are connected to the same HUB, the transmission delay variation between nodes A1 and A2 is practically zero. Therefore, node A1 tunes in to the same frequency as node A2 very quickly. Once node A1 is tuned, and the temperature of the oscillator has stabilized, node A1 will begin to request time stamp message from node A3. From a performance point of view, if node A1 and node A2 are connected to the same HUB, A1 may just as well continue to request time stamps from A2. However, since passing time stamp messages from nodes A3 to node A1 via node A2 will increase the uncertainty of the time interval passed to node A1, it may be preferable to have node A3 exchange time stamp messages with both nodes A1 and A2 directly. Only one of the nodes in the A group needs to request time and frequency information from the other groups. Typically, this would be the node with the better oscillator, A3.

Another exemplary implementation of the inventive time stamp exchange methods is in a peer to peer network. In a peer to peer network all of the nodes have stratum 2 oscillators and one of the nodes will have a GPS receiver. The nodes with the stratum 2 oscillators will exchange time stamp messages with the node containing the GPS receiver for both absolute time and for frequency deviation. According to this embodiment, time stamping can be performed on a higher layer, e.g., the application layer. Since each node contains a stratum 2 oscillator, the nodes will not have to exchange time stamp messages as often as in the embodiment described above in FIG. 17. This results in a low traffic load and less delays in the network. However, placing stratum 2 oscillators in every node will result in a more expensive system than the system described in connection with FIG. 17.

Figure 18:
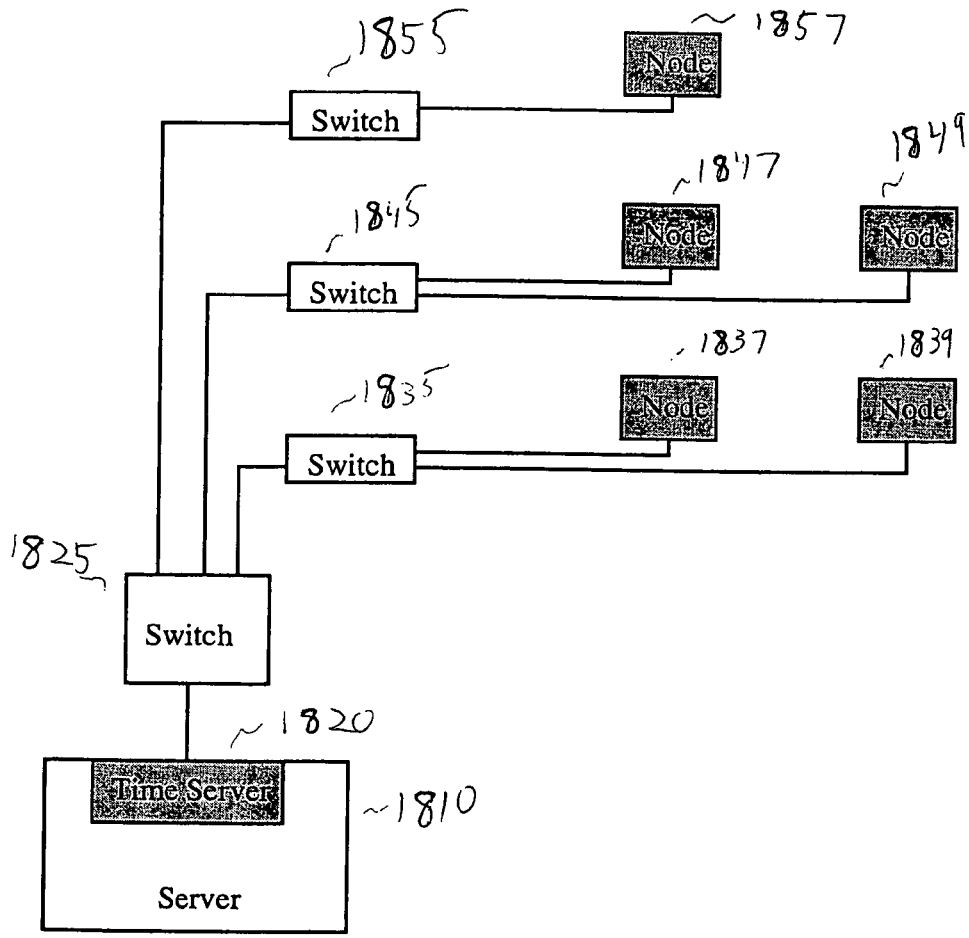
FIG. 18 illustrates an exemplary switched network according to exemplary embodiments of the present invention.

FIG. 18 illustrates yet another exemplary implementation of the present invention. The embodiment of FIG. 18 may be implemented in an Internet Protocol (IP) network. Accordingly, the embodiment of FIG. 18 may be an ordinary data network and the nodes need not be radio base stations. The network 1800 includes a server 1810 which contains a time server 1820. The network 1800 also includes switches 1825, 1835, 1845 and 1855, and nodes 1837, 1839, 1847, 1849 and 1857.

In an IP network which includes switches, time server 1820 is typically calibrated using a GPS receiver. Alternatively, if the network does not require absolute time, but only requires a stable frequency reference, then time server 1820 only requires a high quality oscillator. In an IP based network which does not have any routers, such as switched network 1800, only time stamp messages transferred through the network without being queued in any of the switches are used. All queued time stamp messages are discarded. Whether a message has been queued can be determined using either a confidence interval or by calculating the transmission delay. Using a confidence interval will not require reply time stamp messages except during initialization of the node. According to an exemplary embodiment of the present invention, the time stamp messages can be exchanged once every second. To decrease the risk of continuous collisions between messages transferred to the different nodes, a pseudo random sequence for transferring the messages to the node could be used.

According to one exemplary embodiment, in network 1800 there is no traffic sent between the nodes. Instead, all traffic is sent to and from the server 1810. Since server 1810 controls the amount of traffic sent downstream to the nodes, the time server 1820 can send time stamp messages to the nodes without risk that they will end up in queues in the switches. Accordingly, any queuing of messages will be performed at the server 1810 and the transmission delay from the time server 1820 to one of the nodes will be constant.

When a network 1800 is started up, the nodes exchange a series of time stamp messages with the time server. The estimated transmission delay of each of the time stamp messages is sorted to determine the smallest estimated transmission delay which is used as the transmission delay for the network. Time stamp messages which have not been queued in a switch will have the smallest transmission delay. This transmission delay is maintained for the network until the network architecture is changed. Since the nodes are adjusting their oscillators for frequency drift, and the time server is not adjusting its oscillator, the nodes do not need to send reply time stamp messages. However, one skilled in the art will recognize that if supervision of the nodes is desired then return time stamp messages can be implemented. Alternatively, if no accurate absolute time is necessary, the delay from the time server to each node can be set by the system operator since the operator knows the number of switches between nodes and the delays in each switch.

Another exemplary embodiment of network 1800 is to allow messages to be sent directly between the nodes without requiring the messages to travel to the server 1810. According to this embodiment, messages may be delayed as a result of being queued in the switches. However, the estimation of transmission delay as described above with regard to FIG. 4B is not performed. Instead, the smallest estimated delay for the network is saved in each node and used to validate time stamps. The confidence interval will be based on the state variable of the Kalman observer. Alternatively, the delays in the network can be averaged. This is particularly suited in networks where the message length is limited and the switches implement prioritization of messages.

The difference between the two embodiments illustrated in FIG. 18 and the earlier description of the grouped network is that only one time server is required. Therefore, it is not necessary to have a separation of time and frequency. In addition the Kalman observer's algorithms can be simplified. For example, since the nodes are only exchanging time stamp messages with the time server 1820, there will be no old time points between the frequency point and the current time point. Further, since the time stamp messages may be transmitted every second, the frequency point can be estimated to be at the current time point without any appreciable loss in performance of the algorithms for determining the drift of the oscillator. In addition, the time stamping in the embodiments described in connection with FIG. 18 can be performed on the physical level.

Although the present invention has been described as exchanging time stamp messages, one skilled in the art will recognize that other messages may be necessary e.g. to agree on message formats. In addition, one skilled in the art will recognize that procedures and messages may be necessary to accept/reject interchange of time stamp messages. However, these messages are clearly within the skilled of the ordinary artisan.

The present invention has been described by way of exemplary embodiments to which the invention is not limited. Modifications and changes will occur to those skilled in the art without departing from the spirit and scope of the invention as defined in the appended claims.

What is claimed is:

1. In a network including a first node and a second node, a method for regulating a frequency deviation of an oscillator in the first node comprising the steps of:
   receiving a time stamp message at the second node from the first node;
   transmitting a reply time stamp message from the second node to the first node, wherein the reply time stamp message includes a time of transmission of the reply time stamp message, the second node's estimation of a time interval for said transmission of the reply time stamp message, and second node's uncertainty factor in said estimation of said time interval; and
   calculating an estimated frequency deviation of the oscillator in the first node using the second node's estimation of the time interval in the reply time stamp message.

2. The method of claim 1, further comprising the step of:
   adjusting the oscillator in the first node using the calculated estimated frequency deviation.

3. The method of claim 1, wherein the time interval is a time period between the transmission of two time stamp messages between the first and second nodes.

4. The method of claim 1, further comprising the steps of:
   estimating, in the first node, an absolute time of the transmission of the time stamp message from the first node to the second node; and
   transmitting another time stamp message from the first node to the second node, wherein the another time stamp message includes the estimated absolute time of transmission of the time stamp message and an uncertainty value as to the accuracy of the estimated absolute time of transmission of the time stamp message.

5. The method of claim 4, wherein the uncertainty value of the estimated absolute time is calculated using a Kalman observer.

6. The method of claim 4, further comprising the step of:
   estimating a variance of a transmission delay of the network, wherein the uncertainty value of the estimated absolute time is increased by the variance of the estimated transmission delay.

7. The method of claim 4, further comprising the steps of:
   estimating, in the second node, the absolute time of the transmission of the time stamp message from the first node to the second node; and
   determining, in the second node, whether to use the first node's estimation of the absolute time in the determination of the time deviation of the oscillator of the second node as a function of the first node's estimation of the absolute time, an uncertainty value of the first node's estimation of the absolute time, the second node's estimation of the absolute time and the uncertainty value of the second node's estimation the absolute time.

8. The method of claim 1, further comprising the steps of:
   transmitting a plurality of time stamp messages from the first node to the second node;
   receiving a plurality of reply time stamp messages at the first node; and
   estimating a network delay and a variance of the network delay using a time of transmission of each of the plurality of time stamp messages and a time of reception of each of the plurality of time stamp messages.

9. The method of claim 8, wherein the estimated network delay and the variance of the estimation network delay are used to establish a confidence interval which indicates whether a time stamp message was stuck in the network.

10. The method of claim 1, wherein the uncertainty factor of the estimation of the time interval is calculated using a Kalman observer.

11. The method of claim 1, further comprising the step of:
    estimating a variance of a transmission delay for the network, wherein the uncertainty value of the estimation of the time interval is increased by the variance of the transmission delay.

12. The method of claim 1, further comprising the steps of:
    receiving another time stamp message at a third node;
    transmitting another reply time stamp message from the third node to the first node, wherein the another reply time stamp message includes a time of transmission of the another reply time stamp message and the third node's estimation of another time interval; and
    calculating the estimated frequency deviation of the oscillator in the first node using the second node's estimation of the time Interval and the third nodes estimation of the another time interval.

13. The method of claim 12, wherein the time interval is a time period between the transmission of two time stamp messages between the first node and second node, and the another time interval is a time period between the transmission of two time stamp messages between the first node and the third node.

14. The method of claim 12, wherein the first node, the second node and the third node are one group in a grouped network, the method further comprising the step of:
    exchanging time stamp messages between the first node and another node, the another node being part of another group in the grouped network.

15. The method of claim 12, wherein the first node is a time server in an Internet Protocol network.

16. The method of claim 1, wherein the first node or the second node is a radio base station.

17. The method of claim 1, wherein the time of transmission on a physical layer is included in the reply time stamp message.

18. The method of claim 1, wherein the time stamp message includes a first sub-message and a second sub-message, the first sub-message containing a sequence number and the second sub-message containing the sequence number and a time of transmission of the first sub-message.

19. A network comprising:
a node including:
an oscillator;
means for receiving time stamp messages from another node within network;
means for transmitting reply time stamp messages to said another node, the reply time stamp messages containing a time of transmission, a time elapsed since a previous time stamp message was transmitted, and an uncertainty value as to the accuracy of the time elapsed since the previous time stamp message was transmitted; and
a Kalman observer for determining a frequency deviation of the oscillator using information in a received time stamp message.

20. The network of claim 19, wherein the node further comprises:
means for placing the time of transmission on a physical layer in the reply time stamp message.

21. The network of claim 20, wherein the means for placing the time of transmission in the reply time stamp message is a media access controller.

22. The network of claim 21, wherein the network is a ethernet network.

23. The network of claim 19, further comprising:
a second node; and
a third node including an accurate time or frequency reference.

24. The network of claim 23, further comprising:
a switch between the third node and the first and second nodes, wherein time stamp messages are sent from the third node to the node and the second node.

25. The network of claim 24, wherein the network operates according to an ethernet protocol.

26. The network of claim 25, wherein time stamp messages which are delayed in the network more than a predetermined amount of time are discarded by a node receiving the delayed time stamp messages.

27. The network of claim 23, wherein the Kalman observer determines the frequency deviation of the oscillator using time stamp messages received from the third node and the Kalman observer determines an absolute time for the node using time stamp messages received from the second node.

28. The network of claim 27, wherein the node, the second node and the third node are a group in a grouped network, and wherein the second node contains a second oscillator and the third node contains a third oscillator, whereby a frequency drift of the oscillator in the node is—the same as a frequency drift of the second and third oscillators.

29. The network of claim 23, wherein the accurate time or frequency reference is a global positioning satellite (GPS) receiver.

30. The network of claim 23, further comprising:
a first switch between the third node and the node;
a second switch between the second node and the third node; and
a master switch between the third node and the first and second switches, wherein time stamp messages are sent from the third node to the first node and the second node and time stamp messages which are queued in the first, second or master switch are discarded by the node which receives the queued time stamp message.

31. The network of claim 30, wherein the third node is time server in an Internet Protocol network.

32. The network of claim 30, wherein the network operates according to an ethernet protocol.

33. The network of claim 30, wherein a node determines whether a time stamp message has been queued by determining a transmission delay of the time stamp message.

34. The network of claim 30, wherein time stamp messages have a maximum length, whereby the transmission delay between the nodes is minimized.

35. In a network, a method of regulating an oscillator in a node comprising the steps of:
transmitting a time stamp message from a first node to a second node, wherein the time stamp message includes the first node's estimate of a time interval and said first node's uncertainty factor in said estimated time interval;
estimating, in the second node, the time interval; and
adjusting a frequency of an oscillator in the second node using the first node's estimate of the time interval, said uncertainly factor, and the second node's estimate of the time interval.

36. The method of claim 35, further comprising the step of:
calculating an uncertainty value for the second node's estimate of the time interval,
wherein the frequency of the oscillator in the second node is adjusted using the uncertainty value for the first node's estimate and the uncertainty value of the second node's estimate in addition to the first and second nodes' estimate of the time interval.

37. The method of claim 36, further comprising the step of:
determining, in the first node, whether to use the second node's estimation of the first time interval in the determination of the frequency deviation of the oscillator of the first node as a function of the first node's estimation of the first time interval, the uncertainty value of the first node's estimation of the first time interval, the second node's estimation of the first time interval and the uncertainty value of the second node's estimation of the first time interval.

38. The method of claim 37, further comprising the step of: triggering an alarm, in the first node, if it is determined that the second node's estimation of the first time interval is outside of a confidence interval.

39. The method of claim 35, further comprising the steps of:
transmitting a reply time stamp message from the second node to the first node, wherein the reply time stamp message includes the second node's estimate of the time interval and an uncertainty value as to the second node's estimate of the time interval;
determining an uncertainty value for the first nodes estimate of the time interval; and
adjusting the frequency of an oscillator in the first node using the first and second nodes' estimate of the time interval and the uncertainty values of the first and second nodes' estimate of the time interval.

40. The method of claim 35, further comprising the step of:
calculating an uncertainty value of the first node's estimate of the time interval and the second node's estimate of the time interval, wherein the estimates of the time interval and the uncertainty values of the nodes' estimate of the time interval is performed using a Kalman observer; and determining a frequency drift of the oscillator in the second node using a Kalman observer based on the first node's estimate of the time interval, the uncertainty value of the first node's estimate of the time interval, the second node's estimate of the time interval and the uncertainty value of the second node's estimate of the time interval, wherein the frequency of the oscillator in the second node is adjusted based on the determined frequency drift.

41. A network including a first node, a second node and a third node, a method for oscillator regulation comprising the steps of:

estimating, in the first node, the length of time of a first time interval and the length of time of a second time interval;

receiving, in the first node, a time stamp message from the second node, wherein the time stamp message includes the second node's estimation of the first time interval and said second node's uncertain factor in said estimation of said first time interval;

receiving, in the first node, a time stamp message from the third node, wherein the time stamp message includes the third node's estimation of the second time interval; and determining a frequency deviation of the oscillator of the first node based on the first node's estimation of the first and second time intervals, the second node's estimation of the first time interval and said uncertain factor and the third node's estimation of the second time interval.

42. The method of claim 41, further comprising the step of:

calculating, in the first node, an uncertainty value of the first node's estimation of the first time interval and an uncertainty value of the first node's estimation of the second time interval, wherein the time stamp message from the third node also includes an uncertainty value of the third node's estimation of the second time interval, and wherein the step of determining the frequency deviation of the oscillator of the first node is also based on the first node's uncertainty value of the first node's estimation of the first and second time intervals, the second node's uncertainty value of the second node's estimation of the first time interval and the uncertainty value of the third node's estimation of the second time interval.

43. The method of claim 42, wherein the uncertainty values of the first node's estimation of the first and second time intervals are determined using a Kalman observer.

44. The method of claim 42, further comprising the step of:

determining, in the first node, whether to use the second node's estimation of the first time interval in the determination of the frequency deviation of the oscillator of the first node as a function of the first node's estimation of the first time interval, the uncertainty value of the first node's estimation of the first time interval, the second node's estimation of the first time interval and the uncertainty value of the second node's estimation of the first time interval.

45. The method of claim 44, wherein the first node includes a global positioning satellite (GPS) receiver, the method further comprising the steps of:

comparing the first node's estimate of the first time interval with the second node's estimate of the first time interval; and discarding, in the first node, the second node's estimate of the first time interval if the second node's estimate of the first time interval is more than a predetermined time longer or shorter than the first node's estimate of the first time interval and the uncertainty value of the second node's estimate of the first time interval is greater than the uncertainty value of the first node's estimate of the first time interval.

46. The method of claim 42, further comprising the step of:

sending an alarm, from the first node, to an operator of the second node if it is determined that the second node's estimate of the time interval with the uncertainty value of the second node's estimate of the time interval is more than a predetermined amount different from the first node's estimate of the time interval with the uncertainty value of the first node's estimate of the time interval.

47. The method of claim 46, wherein the first node includes a global positioning satellite (GPS) receiver.

48. The method of claim 41, further comprising the step of:

estimating, in the second node, an absolute time of a predetermined event, wherein the time stamp message received in the first node includes the estimation of the absolute time of the predetermined event.

49. The method of claim 48, wherein the predetermined event is a beginning of transmission of the time stamp message sent from the second node to the first node.

50. The method of claim 48, further comprising the steps of:

determining an uncertainty value of the second node's estimation of the absolute time of the predetermined event;

estimating, in the first node, the absolute time of the predetermined event; and determining an uncertainty value of the first node's estimation of the absolute time of the predetermined event, wherein the first node's estimation of the absolute time, the uncertainty value of me first node's estimation of the absolute time, the second node's estimation of the absolute time and the uncertainty value of the second node's estimation of the absolute time is used to update a time reference in the first node and a time reference in the second node.

* * * * *

UNITED STATES PATENT AND TRADEMARK OFFICE
CERTIFICATE OF CORRECTION

PATENT NO. : 7,103,124 B1
APPLICATION NO. : 09/475190
DATED : September 5, 2006
INVENTOR(S) : Lindskog et al.

It is certified that error appears in the above-identified patent and that said Letters Patent is hereby corrected as shown below:

In column 8, Lines 28-29, in Equation "2", delete "$X_k=F_kX_{k-1}\ G_k+V$" and insert -- $X_k=F_kX_{k-1}+G_k+V_k$ --, therefor.

In Column 9, Line 67, in Equation "10", delete "$\epsilon_\kappa$" and insert -- $\varepsilon_k$ --, therefor.

In Column 10, Line 3, delete "$\epsilon_\kappa$" and insert -- $\varepsilon_k$ --, therefor.

In Column 10, Line 18, in Equation "13", delete "$\hat{x}_{k+1} = F_k\hat{x}_k + G_k + K_k \epsilon_k$" and insert -- $\hat{x}_{k+1} = F_k\hat{x}_k + G_k + K_k\varepsilon_k$ --, therefor.

In Column 16, Lines 55-58, delete "$\left(1 - \frac{pv_{J',1} + (1-p)v_{J,i}}{\mu_{I,i}^2}\right)$" and insert -- $\left(1 - \frac{pv_{J',i} + (1-p)v_{I,I}}{\mu_{I,i}^2}\right)$ --, therefor.

In Column 18, Line 42, in Equation "32", delete "$y_{1,i} = \tau_{i,t} - 0_i - \Delta_{i,1} \approx \tau_{i,t} - 0_i \Delta_i$" and insert -- $y_{1,i} = \tau_{i,t} - 0_i - \Delta_{i,1} \approx \tau_{i,t} - 0_i - \Delta_i$ --, therefor.

In Column 19, Line 55, delete "$\epsilon_n$" and insert -- $\varepsilon_n$ --, therefor.

In Column 20, Line 59, delete "x," and insert -- $x_1$ --, therefor.

In Column 24, Line 25, in Equation "46", delete "$Abs(\epsilon_{1,k}) < k_{13} * (\sqrt{(Var(\epsilon_{1,k}))})$" and insert -- $Abs(\epsilon_{1,k}) < k_{13} * (\sqrt{(Var(\varepsilon_{1,k})))}$ --, therefor.

UNITED STATES PATENT AND TRADEMARK OFFICE
CERTIFICATE OF CORRECTION

PATENT NO.         : 7,103,124 B1
APPLICATION NO. : 09/475190
DATED              : September 5, 2006
INVENTOR(S)        : Lindskog et al.

It is certified that error appears in the above-identified patent and that said Letters Patent is hereby corrected as shown below:

In Column 32, Line 52, in Claim 50, delete "me" and insert -- the --, therefor.

Signed and Sealed this

Sixth Day of October, 2009

David J. Kappos
*Director of the United States Patent and Trademark Office*